US010240080B2

(12) United States Patent
Gamage et al.

(10) Patent No.: US 10,240,080 B2
(45) Date of Patent: Mar. 26, 2019

(54) TEMPERATURE-TRIGGERED VISCOSIFIER FOR TREATMENT OF A SUBTERRANEAN FORMATION

(71) Applicant: Halliburton Energy Services, Inc., Houston, TX (US)

(72) Inventors: Pubudu Hasanka Gamage, Katy, TX (US); Sandeep D. Kulkarni, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 121 days.

(21) Appl. No.: 15/029,483

(22) PCT Filed: Feb. 12, 2014

(86) PCT No.: PCT/US2014/016114
§ 371 (c)(1),
(2) Date: Apr. 14, 2016

(87) PCT Pub. No.: WO2015/122889
PCT Pub. Date: Aug. 20, 2015

(65) Prior Publication Data
US 2017/0174982 A1 Jun. 22, 2017

(51) Int. Cl.
C09K 8/68 (2006.01)
C09K 8/88 (2006.01)
(Continued)

(52) U.S. Cl.
CPC ............ *C09K 8/685* (2013.01); *C08F 265/10* (2013.01); *C08L 53/00* (2013.01); *C09K 8/035* (2013.01);
(Continued)

(58) Field of Classification Search
None
See application file for complete search history.

(56) References Cited

U.S. PATENT DOCUMENTS 3,679,000 A 7/1972 Kaufman
4,440,228 A 4/1984 Swanson
(Continued)

FOREIGN PATENT DOCUMENTS

WO 2011092221 8/2011
WO WO-2015122889 A1 8/2015

OTHER PUBLICATIONS

Intellectual Property Office of Singapore Written Opinion for Singapore Application No. 11201604462T dated Jun. 3, 2017.
(Continued)

Primary Examiner — John J Figueroa
(74) Attorney, Agent, or Firm — Tenley Krueger; C. Tumey Law Group PLLC

(57) ABSTRACT

Various embodiments disclosed related to methods, compositions, and systems for treatment of a subterranean formation. In various embodiments, the present invention provides a method of treating a subterranean formation. The method can include obtaining or providing a composition including a crosslinkable viscosifier polymer. The crosslinkable viscosifier polymer can include an ethylene repeating unit including a —C(O)NH$_2$ group and an ethylene repeating unit including an —S(O)$_2$OR$^1$ group, wherein the repeating units are in block, alternate, or random configuration. At each occurrence R$^1$ can be independently selected from the group consisting of —H and a counterion. The composition can also include at least one crosslinker. The method also includes placing the composition in a subterranean formation downhole.

20 Claims, 3 Drawing Sheets

(51) Int. Cl.
  *C09K 8/80*   (2006.01)
  *C09K 8/035*  (2006.01)
  *E21B 43/24*  (2006.01)
  *E21B 43/267* (2006.01)
  *C09K 8/12*   (2006.01)
  *C09K 8/90*   (2006.01)
  *C08L 53/00*  (2006.01)
  *C08F 265/10* (2006.01)

(52) U.S. Cl.
  CPC .................. *C09K 8/12* (2013.01); *C09K 8/80* (2013.01); *C09K 8/882* (2013.01); *C09K 8/887* (2013.01); *C09K 8/90* (2013.01); *E21B 43/2405* (2013.01); *E21B 43/267* (2013.01)

(56) References Cited

U.S. PATENT DOCUMENTS

| | | | |
|---|---|---|---|
| 4,540,498 A | | 9/1985 | Wu et al. |
| 2004/0152602 A1* | | 8/2004 | Boles .................. C09K 8/74 507/100 |
| 2010/0004351 A1 | | 1/2010 | Michaux et al. |
| 2010/0311623 A1 | | 12/2010 | Rey et al. |
| 2010/0331510 A1 | | 12/2010 | Reichenbach-Klinke et al. |
| 2012/0006551 A1 | | 1/2012 | Carman et al. |
| 2012/0129734 A1 | | 5/2012 | Reichenbach-Klinke et al. |
| 2012/0132420 A1 | | 5/2012 | Langlotz et al. |
| 2012/0202958 A1 | | 8/2012 | Liu et al. |
| 2014/0352969 A1* | | 12/2014 | Chung .................. C09K 8/588 166/308.3 |
| 2016/0083641 A1* | | 3/2016 | Gamage ................ E21B 21/062 507/226 |

OTHER PUBLICATIONS

"International Application Serial No. PCT/US2014/016114, International Search Report dated Nov. 25, 2014", 3 pgs.

"International Application Serial No. PCT/US2014/016114, Written Opinion dated Nov. 25, 2014", 11 pgs.

Clifford, P. J., et al., "The Effects of Chemical Degradation on Polymer Flooding", SPE 13586, SPE Oilfield and Geothermal Chemistry Symposium, held Mar. 9-11, 1985, Phoenix, AZ, (1985), 23 pgs.

Tielong, C., et al., "A Pilot Test of Polymer Flooding in an Elevated-Temperature Reservoir", SPE Reservoir Evaluation & Engineering, (1998), 24-29.

Wang, D., et al., "Review of Practical Experience of Polymer Flooding at Daqing", SPE Reservoir Evaluation & Engineering, (2009), 470-476.

"Some Key Features to Consider when Studying Acrylamide-Based Polymers for Chemical Enhanced Oil Recovery" Thomas, A., Gaillard, N. and Favero C. Oil & Gas Science and Technology—Rev. IFP Energies Nouvelles, vol. 67 (6), 2012, pp. 887-902.

Klaus Weggen, Gunter Pusch, Heinrich Rischmuller, Oil & Gas, Ullmann's Encyclopedia of Industrial Chemistry; Wiley Online Library (Major Reference Works), First published Jun. 15, 2000.

"Acrylamide Polymers" Sun Yi Huang, David W Lipp, Ramond S Farinato, Kirk-Othmer Encyclopedia of Chemical Technology, Wiley Online Library, Major Reference Works, First Published: Aug. 17, 2001.

Non-Final Office Action for U.S. Appl. No. 15/030,647 dated Jan. 31, 2018.

Non-Final Office Action for U.S. Appl. No. 15/030,712 dated Feb. 7, 2018.

* cited by examiner

TEMPERATURE-TRIGGERED VISCOSIFIER FOR TREATMENT OF A SUBTERRANEAN FORMATION

PRIORITY APPLICATIONS

This application is a U.S. National Stage Filing under 35 U.S.C. 371 from International Application No. PCT/US2014/016114, filed on Feb. 12, 2014, and published as WO 2015/122889 on Aug. 20, 2015, which application and published are incorporated herein by reference in their entirety.

BACKGROUND OF THE INVENTION

During the drilling, stimulation, completion, and production phases of wells for petroleum or water extraction, the downhole use of compositions having high viscosities is important for a wide variety of purposes. Higher viscosity fluids can more effectively carry materials to a desired location downhole, such as proppants. The use of higher viscosity fluids during hydraulic fracturing generally results in larger more dominant fractures. Higher viscosity drilling fluids can more effectively carry materials away from a drilling location downhole.

One common way to attain high viscosities in drilling fluids is to use a mixture of water and a viscosifier, such as guar gum. However, typically viscosifiers must be added in high concentrations to provide viscosities sufficient to suspend a desired proppant or to suspend drill cuttings, which can result in high transportation costs and low efficiency preparation of viscous materials. However, pumping high viscosity materials downhole can require a large amount of energy. Also, the higher temperatures experienced downhole can limit, reduce, or degrade the effectiveness of certain viscosifiers, resulting in the use of larger amounts of viscosifiers to compensate for the high temperatures, or the use of expensive temperature-resistant viscosifiers. In addition, the presence of certain ions in water can limit, reduce, or degrade the effectiveness of certain viscosifiers. This limits the use of certain ion-containing water, such as sea water, or water recovered from or naturally produced by some subterranean formations. As a result, the oil and gas industry spends substantial amounts of money and energy to use large amounts of viscosifiers to compensate for the salt sensitivity, obtain expensive salt-resistant viscosifiers, obtain fresh water used for drilling fluid or fracturing fluid applications, or to avoid formations having substantial concentrations of particular ions.

SUMMARY OF THE INVENTION

In various embodiments, the present invention provides a method of treating a subterranean formation. The method includes obtaining or providing a composition including a crosslinkable viscosifier polymer. The crosslinkable viscosifier polymer includes an ethylene repeating unit including a —C(O)NH$_2$ group and an ethylene repeating unit including an —S(O)$_2$OR$^1$ group, wherein the repeating units are in block, alternate, or random configuration. At each occurrence, R$^1$ is independently selected from the group consisting of —H and a counterion. The composition also includes at least one crosslinker. The method also includes placing the composition in a subterranean formation downhole.

In various embodiments, the present invention provides a method of treating a subterranean formation. The method includes obtaining or providing a composition including a crosslinkable viscosifier polymer including repeating units having the structure:

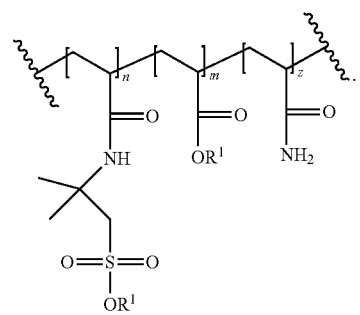

The repeating units are in a block, alternate, or random configuration, and each repeating unit is independently in the orientation shown or in the opposite orientation. At each occurrence, R$^1$ is independently selected from the group consisting of —H and a counterion. The crosslinkable viscosifier polymer has a molecular weight of about 5,000,000 g/mol to about 15,000,000 g/mol. The variable n is about 5,000 to about 75,000, z is about 2,500 to about 170,000, and m is about 0 to about 60,000. The composition includes a crosslinker including at least one of zirconium and a zirconium derivative. The composition also includes a downhole fluid including at least one of an aqueous drilling fluid and an aqueous fracturing fluid. The method also includes placing the composition in a subterranean formation downhole, wherein about 0.01 wt % about 10 wt % of the composition is the crosslinkable viscosifier polymer and the crosslinker.

In various embodiments, the present invention provides a system including a composition that includes a crosslinkable viscosifier polymer. The crosslinkable viscosifier polymer has about Z$^1$ mol % of an ethylene repeating unit including a —C(O)NH$_2$ group, about N$^1$ mol % of an ethylene repeating unit including an —S(O)$_2$OR$^1$ group, and about M$^1$ mol % of an ethylene repeating unit including a —C(O)OR$^1$ group, wherein the repeating units are in block, alternate, or random configuration. At each occurrence, R$^1$ is independently selected from the group consisting of —H and a counterion. The variable Z$^1$ is about 10% to about 90%, N$^1$ is about 10% to about 90%, and M$^1$ is about 0% to about 40%. The crosslinkable viscosifier polymer has a molecular weight of about 5,000,000 g/mol to about 15,000,000 g/mol. The composition also includes a crosslinker including at least one of zirconium and a zirconium derivative. The system also includes a subterranean formation including the composition therein.

In various embodiments, the present invention provides a composition for treatment of a subterranean formation, the composition including a crosslinkable viscosifier polymer. The crosslinkable viscosifier polymer has about Z$^1$ mol % of an ethylene repeating unit including a —C(O)NH$_2$ group, about N$^1$ mol % of an ethylene repeating unit including an —S(O)$_2$OR$^1$ group, and about M$^1$ mol % of an ethylene repeating unit including a —C(O)OR$^1$ group, wherein the repeating units are in block, alternate, or random configuration. At each occurrence. R$^1$ is independently selected from the group consisting of —H and a counterion. The variable Z$^1$ is about 10% to about 90%, N$^1$ is about 10% to about 90%, and M$^1$ is about 0% to about 40%. The crosslinkable viscosifier polymer has a molecular weight of about 5,000,000 g/mol to about 15,000,000 g/mol. The composition includes a crosslinker including at least one of zirconium and a zirconium derivative. The composition also includes a downhole fluid.

In various embodiments, the present invention provides a composition for treatment of a subterranean formation, the composition including a crosslinkable viscosifier polymer. The crosslinkable viscosifier polymer includes repeating units having the structure:

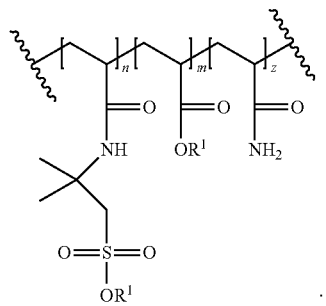

the repeating units are in a block, alternate, or random configuration, and each repeating unit is independently in the orientation shown or in the opposite orientation. At each occurrence, $R^1$ is independently selected from the group consisting of —H and a counterion. The crosslinkable viscosifier polymer has a molecular weight of about 5,000,000 g/mol to about 15,000,000 g/mol. The variable n is about 5,000 to about 75,000, z is about 2,500 to about 170,000, and m is about 0 to about 60,000. The composition includes a crosslinker including at least one of zirconium and a zirconium derivative. The composition also includes a downhole fluid including at least one of an aqueous drilling fluid and an aqueous hydraulic fracturing fluid, wherein about 0.01 wt % about 10 wt % of the composition is the crosslinkable viscosifier polymer and the crosslinker.

In various embodiments, the present invention provides a method of preparing a composition for treatment of a subterranean formation. The method includes forming a composition including a crosslinkable viscosifier polymer. The crosslinkable viscosifier polymer has about $Z^1$ mol % of an ethylene repeating unit including a —C(O)NH$_2$ group, about $N^1$ mol % of an ethylene repeating unit including an —S(O)$_2$OR$^1$ group, and about $M^1$ mol % of an ethylene repeating unit including a —C(O)OR$^1$ group, wherein the repeating units are in block, alternate, or random configuration. At each occurrence, $R^1$ is independently selected from the group consisting of —H and a counterion. The variable $Z^1$ is about 10% to about 90%, $N^1$ is about 10% to about 90%, and $M^1$ is about 0% to about 40%. The crosslinkable viscosifier polymer has a molecular weight of about 5,000,000 g/mol to about 15,000,000 g/mol. The composition includes a crosslinker including at least one of zirconium and a zirconium derivative. The composition also includes a downhole fluid.

Various embodiments of the present invention provide certain advantages over other compositions including viscosifiers and methods of using the same, at least some of which are unexpected. For example, in some embodiments, the crosslinkable viscosifier polymer can provide a greater increase in viscosity of a downhole fluid per mass (e.g., via at least partially crosslinking the crosslinkable viscosifier polymer) than other viscosifiers. Compared to the viscosity of a downhole fluid having a given concentration of a viscosifier (or, e.g., a downhole fluid formed by at least partially crosslinking a given concentration of a viscosifier), a corresponding downhole fluid having the same or lower concentration of various embodiments of the crosslinkable viscosifier polymer (or, e.g., formed by at least partially crosslinking the crosslinkable viscosifier polymer) can have a higher viscosity. In some embodiments, by enabling a higher viscosity with the use of less viscosifier, the crosslinkable viscosifier polymer can provide lower transportation costs and shorter preparation time, making operations more efficient overall.

In various embodiments, the crosslinkable viscosifier polymer can be less expensive per unit mass as compared to conventional viscosifiers. In various embodiments, the crosslinkable viscosifier polymer can provide a greater viscosity increase per unit cost as compared to other viscosifiers. In various embodiments, the crosslinkable viscosifier polymer can provide a greater viscosity increase per unit cost in the presence of various salts or under high temperature conditions, as compared to other viscosifiers.

Conventional viscosifiers provide viscosification of a composition before and during transport to a desired location downhole, requiring the energy-intensive pumping of a high viscosity composition through tubular conduits to reach the desired location downhole. In various embodiments, the crosslinkable viscosifier polymer partially or fully avoids providing a viscosity increase until the composition reaches or becomes near a desired subterranean location. In various embodiments, the viscosity increase provided by the crosslinkable viscosifier polymer can be triggered by heat, such as the higher temperature of the desired location downhole. In various embodiments, by delaying the viscosity increase, the crosslinkable viscosifier polymer can provide a more efficient method of providing high viscosity compositions to a desired downhole location. In some embodiments, the crosslinkable viscosifier polymer can be optimized for use at a particular temperature by varying the structure or concentration of at least one of the viscosifier and the crosslinker to provide a desired viscosity in a desired location downhole.

Many conventional viscosifiers suffer a decrease in the viscosity provided when used under high temperature conditions such as the conditions found downhole in many subterranean formations. In some embodiments, under high temperature conditions, the crosslinkable viscosifier polymer can provide a higher viscosity or can provide less or no decrease in viscosity as compared to the viscosity provided by other conventional viscosifiers under corresponding conditions. In various embodiments, the higher temperature stability of the crosslinkable viscosifier polymer can allow a desired level of viscosification with the use of less viscosifier, or can allow a higher viscosity to be achieved downhole, as compared to other conventional viscosifiers, thereby providing a more versatile, more cost effective, or more efficient viscosification downhole than other methods and compositions.

Many conventional viscosifiers suffer a decrease in the viscosity provided when used with liquids such as water having certain ions present at particular concentrations. For example, many viscosifiers suffer a decrease in the viscosity provided when used with liquids having certain amounts of salts dissolved therein such as sodium chloride or potassium chloride. In some embodiments, the crosslinkable viscosifier polymer can be used with liquids having ions dissolved therein and can suffer less or no negative effects from the ions, as compared to conventional methods and compositions for downhole use, such as less or no decrease in the viscosity provided. By being able to retain the viscosity provided or suffer less reduction in viscosity in the presence of various ions or in the presence of larger amounts of particular ions than other methods and compositions, various embodiments can avoid the need for ion-free or ion-depleted water, or can avoid a need to add greater amounts of viscosifier to achieve a desired effect downhole, and can thereby be more versatile, more cost effective, or more efficient than other methods and compositions for downhole use.

In various embodiments, by providing a higher viscosity under high temperature conditions or high salinity conditions, the crosslinkable viscosifier polymer can provide a more effective downhole fluid, such as a more effective drilling fluid that has greater cutting carrying capacity, sag resistance, or equivalent circulating density, or a more effective hydraulic fracturing fluid that can more effectively carry proppant or form more dominant fractures. In various embodiments, by providing a higher viscosity under high temperature conditions or high salinity conditions, the crosslinkable viscosifier polymer can provide a more effective sweeping agent (e.g., for removing cuttings from the wellbore), improved equivalent circulating density management, and improved fluid loss control (e.g., the higher viscosity can reduce fluid flow in pore spaces).

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
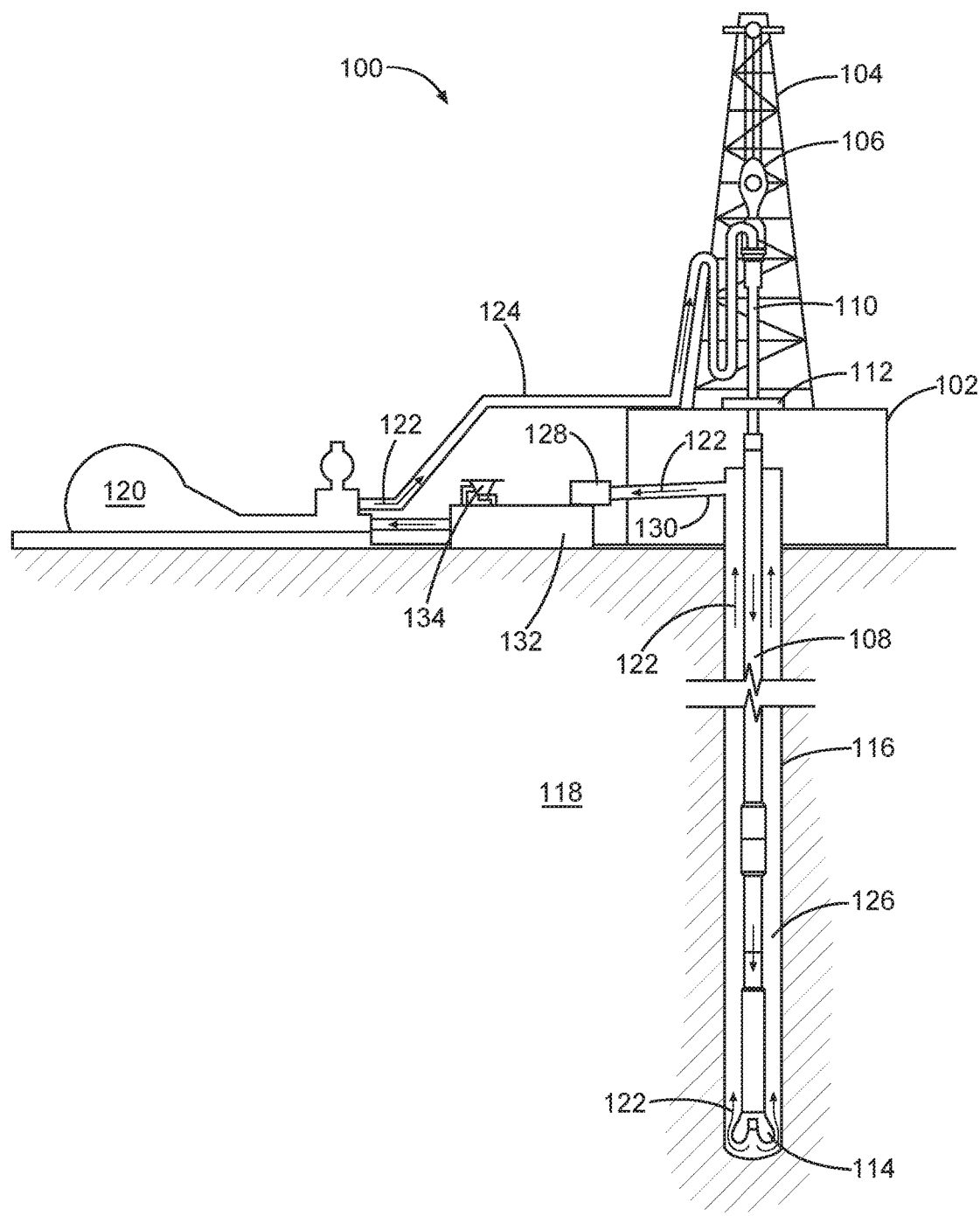
FIG. 1 illustrates a drilling assembly, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750,000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C (O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R')$_2$, CN, NO, NO$_2$, ONO$_2$, azido, CF$_3$, OCF$_3$, R', O (oxo), S (thiono), C(O), S(O), methylenedioxy, ethylenedioxy, N(R)$_2$, SR, SOR, SO$_2$R', SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl. —CH=CH (CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbons that do not contain heteroatoms in the ring. Thus aryl groups include, but are not limited to, phenyl, azulenyl, heptalenyl biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "heterocyclyl" as used herein refers to aromatic and non-aromatic ring compounds containing 3 or more ring members, of which, one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a C$_2$-heterocyclyl can be a 5-ring with two carbon atoms and three heteroatoms, a 6-ring with two carbon atoms and four heteroatoms and so forth. Likewise a C$_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen." or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Nonlimiting examples of solvents are silicones, organic compounds, water, alcohols, ionic liquids, and supercritical fluids.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packing fluid" refers to fluids or slurries that can be placed in the annular region of a well between tubing and outer casing above a packer. In various examples, the packing fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore, or vice-versa. A flow pathway can include at least one of a hydraulic fracture, a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

Method of Treating a Subterranean Formation.

In various embodiments, the present invention provides a method of treating a subterranean formation. The method includes obtaining or providing a composition including a crosslinker and a crosslinkable viscosifier polymer including an ethylene repeating unit including a —C(O)NH$_2$ group and an ethylene repeating unit including an —S(O)$_2$OR$^1$ group, wherein the repeating units are in block, alternate, or random configuration. At each occurrence, R$^1$ is independently selected from the group consisting of —H and a counterion. The obtaining or providing of the composition can occur at any suitable time and at any suitable location. The obtaining or providing of the composition can occur above the surface. The obtaining or providing of the composition can occur downhole. The method also includes placing the composition in a subterranean formation. The placing of the composition in the subterranean formation can include contacting the composition and any suitable part of the subterranean formation, or contacting the composition and a subterranean material downhole, such as any suitable subterranean material. The subterranean formation can be any suitable subterranean formation. In some embodiments, the method is a method of drilling the subterranean formation. In some embodiments, the method is a method of fracturing the subterranean formation. For example, the composition can be used as or with a drilling fluid or a hydraulic fracturing fluid.

In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing and can include any suitable contacting between the subterranean formation and the composition. The placing of the composition in the subterranean formation can include at least partially depositing the composition in a fracture, flow pathway, or area surrounding the same.

The method can include hydraulic fracturing, such as a method of hydraulic fracturing to generate a fracture or flow pathway. The placing of the composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the composition is placed or contacted, or the composition is placed or contacted to an area surrounding the generated fracture or flow pathway.

In some embodiments, in addition to the viscosifier polymer and the crosslinker, the composition can include an aqueous liquid. The method can further include mixing the aqueous liquid with the polymer viscosifier. The mixing can occur at any suitable time and at any suitable location, such as above surface or downhole. The aqueous liquid can be any suitable aqueous liquid, such as at least one of water, brine, produced water, flowback water, brackish water, and sea water. In some embodiments, the aqueous liquid can include at least one of an aqueous drilling fluid and an aqueous fracturing fluid.

The composition can include any suitable proportion of the aqueous liquid, such that the composition can be used as described herein. For example, about 0.000,1 wt % to 99.999,9 wt % of the composition can be the aqueous liquid, or about 0.01 wt % to about 99.99 wt %, about 0.1 wt % to about 99.9 wt %, or about 20 wt % to about 90 wt %, or about 0.000,1 wt % or less, or about 0.000,001 wt %, 0.000,1, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999 wt %, or about 99.999,9 wt % or more of the composition can be the aqueous liquid.

The aqueous liquid be a salt water. The salt can be any suitable salt, such as at least one of NaBr, $CaCl_2$, $CaBr_2$, $ZnBr_2$, KCl, NaCl, a magnesium salt, a bromide salt, a formate salt, an acetate salt, and a nitrate salt. The viscosifier polymer and crosslinker can effectively provide increased viscosity in aqueous solutions having various total dissolved solids levels, or having various ppm salt concentrations. The viscosifier polymer and crosslinker can provide effective increased viscosity of a salt water having any suitable total dissolved solids level (e.g., wherein the dissolved solids correspond to dissolved salts), such as about 1,000 mg/L to about 250,000 mg/L, or about 1,000 mg/L or less, or about 5,000 mg/L, 10,000, 15,000, 20,000, 25,000, 30,000, 40,000, 50,000, 75,000, 100,000, 125,000, 150,000, 175,000, 200,000, 225,000, or about 250,000 mg/L or more. The viscosifier polymer and crosslinker can provide effective increased viscosity of a salt water having any suitable salt concentration, such as about 1,000 ppm to about 300,000 ppm, or about 1,000 ppm to about 150,000 ppm, or about 1,000 ppm or less, or about 5,000 ppm, 10,000, 15,000, 20,000, 25,000, 30,000, 40,000, 50,000, 75,000, 100,000, 125,000, 150,000, 175,000, 200,000, 225,000, 250,000, 275,000, or about 300,000 ppm or more. In some examples, the aqueous liquid can have a concentration of at least one of NaBr. $CaCl_2$, $CaBr_2$. $ZnBr_2$, KCl, and NaCl of about 0.1% w/v to about 20% w/v, or about 0.1% w/v or less, or about 0.5% w/v, 1, 2, 3, 4, 5, 6, 7, 8, 9, 10, 11, 12, 13, 14, 15, 16, 17, 18, 19, 20, 21, 22, 23, 24, 25, 26, 27, 28, 29, or about 30% w/v or more.

The viscosifier polymer and crosslinker can be sufficient to provide effective increased viscosity to an aqueous liquid at various high temperatures. For example, the viscosifier polymer and crosslinker can provide effective increased viscosity at up to about 450° F., or up to about 440° F., 430, 420, 410, 400, 390, 380, 370, 360, 350, 340, 330, 320, 310, 300, 290, 280, 270, 260, 250, 240, 230, 220, 210, 200, 190, 180, 170, 160, 150, 140, 130, 120, 110, or up to about 100° F.

The method can include at least partially crosslinking the crosslinkable viscosifier polymer to provide a crosslinked viscosifier polymer. The crosslinking can include at least partially reacting the crosslinkable viscosifier polymer with at least the crosslinker to provide an at least partially crosslinked viscosifier polymer. The crosslinking can occur in any suitable location and at any suitable time. For example, the crosslinking can occur above-surface, downhole, or a combination thereof. In some embodiments, the crosslinking can be triggered by a suitable event, for example, chemical triggering (e.g., contacting with one or more chemicals that initiate or catalyze the crosslinking reaction), temperature triggering (e.g., raising the temperature of the composition such that the crosslinking reaction occurs), or a combination thereof.

Temperature triggering can include exposing the composition to suitably high temperature downhole in the subterranean formation wherein a higher viscosity is desired. Temperature-triggered crosslinking can include exposing the composition to a temperature of about 100° F. to about 450° F., 150° F. to about 300° F., 175° F. to about 250° F., or about 450° F. or more, or about 440° F., 430, 420, 410, 400, 390, 380, 370, 360, 350, 340, 330, 320, 310, 300, 290, 280, 270, 260, 250, 240, 230, 220, 210, 200, 190, 180, 170, 160, 150, 140, 130, 120, 110, or about 100° F. or less.

The composition can have any suitable viscosity above surface and downhole, such that the composition can be used as described herein. The viscosity can be affected by any suitable component, such as one or more crosslinkable viscosifier polymers, one or more crosslinkers, one or more crosslinked products of the crosslinkable viscosifier polymer and the crosslinker, one or more secondary viscosifiers, one or more secondary crosslinkers, one or more crosslinked products of a secondary viscosifier and a secondary crosslinker, or any combination thereof. In some embodiments, the viscosity is affected by one or more crosslinked products of the crosslinkable viscosifier polymer. In some embodiments, the viscosity of the composition, at standard temperature and pressure and at a shear rate of about 50 $s^{-1}$ to about 500 $s^{-1}$, is about 0.01 cP to about 1,000,000 cP, or about 0.01 cP or less, or about 0.1 cP, 1, 2, 3, 4, 5, 10, 15, 20, 25, 50, 75, 100, 150, 200, 250, 500, 750, 1,000, 1,250, 1,500, 2,000, 2,500, 5,000, 10,000, 15,000, 20,000, 25,000, 50,000, 75,000, 100,000, 125,000, 150,000, 175,000, 200,000, 225,000, 250,000, 500,000, or about 1,000,000 cP or more. In some embodiments, the viscosity of the composition, at standard temperature and pressure and at a shear rate of about 0 $s^{-1}$ to about 1 $s^{-1}$, is about 0.01 cP to about 1,000,000 cP, or about 0.01 cP or less, or about 0.1 cP, 1, 2, 3, 4, 5, 10, 15, 20, 25, 50, 75, 100, 150, 200, 250, 500, 750, 1,000, 1,250, 1,500, 2,000, 2,500, 5,000, 10,000, 15,000, 20,000, 25,000, 50,000, 75,000, 100,000, 125,000, 150,000, 175,000, 200,000, 225,000, 250,000, 500,000, or about 1,000,000 cP or more.

Prior to the at least partial crosslinking of the composition, the composition can have any suitable viscosity. In some embodiments, the viscosity of the composition, at standard temperature and pressure and at a shear rate of about 50 $s^{-1}$ to about 500 $s^{-1}$, is about 0.01 cP to about 1,000,000 cP, about 0.01 cP to about 10,000 cP, or about 0.01 cP or less, or about 0.1 cP, 1, 2, 3, 4, 5, 10, 15, 20, 25, 50, 75, 100, 150, 200, 250, 500, 750, 1,000, 1,250, 1,500, 2,000, 2,500, 5,000, 10,000, 15,000, 20,000, 25,000, 50,000, 75,000, 100,000, 125,000, 150,000, 175,000, 200,000, 225,000, 250,000, 500,000, or about 1,000,000 cP or more.

After the at least partial crosslinking of the composition, the composition can have any suitable viscosity. In some embodiments, after the crosslinking the viscosity of the composition, at standard temperature and pressure and at a shear rate of about 50 $s^{-1}$ to about 500 $s^{-1}$, can be about 10 cP to about 1,000,000 cP, about 1,000 cP to about 100,000 cP, or about 10 cP or less, or about 15 cP, 20, 25, 50, 75, 100, 150, 200, 250, 500, 750, 1,000, 1,250, 1,500, 2,000, 2,500, 5,000, 10,000, 15,000, 20,000, 25,000, 50,000, 75,000, 100,000, 125,000, 150,000, 175,000, 200,000, 225,000, 250,000, 500,000, or about 1,000,000 cP or more. In some embodiments, after the crosslinking the viscosity of the composition, at standard temperature and pressure and at a shear rate of about 0 $s^{-1}$ to about 1 $s^{-1}$, can be about 10 cP to about 1,000,000 cP, about 1,000 cP to about 100,000 cP, or about 10 cP or less, or about 15 cP, 20, 25, 50, 75, 100, 150, 200, 250, 500, 750, 1,000, 1,250, 1,500, 2,000, 2,500, 5,000, 10,000, 15,000, 20,000, 25,000, 50,000, 75,000, 100,000, 125,000, 150,000, 175,000, 200,000, 225,000, 250,000, 500,000, or about 1,000,000 cP or more.

Crosslinkable Viscosifier Polymer.

The composition includes at least one crosslinkable viscosifier polymer, or a crosslinked reaction product thereof (e.g., a reaction product of a crosslinking reaction between the crosslinkable viscosifier polymer and a crosslinker). The crosslinkable viscosifier polymer can include an ethylene repeating unit including a —C(O)NH$_2$ group and an ethylene repeating unit including an —S(O)$_2$OR$^1$ group, wherein the repeating units are in block, alternate, or random configuration. At each occurrence, R$^1$ can be independently selected from the group consisting of —H and a suitable counterion.

Any suitable concentration of the crosslinkable viscosifier polymer can be present in the composition, such that the composition can be used as described herein. In some embodiments, about 0.001 wt % to about 95 wt % of the composition is the one or more crosslinkable viscosifier polymers, or about 30 wt % to about 95 wt %, or about 70 wt % to about 90 wt %, or about 0.001 wt % or less, or about 0.01 wt %, 0.1, 1, 2, 3, 4, 5, 10, 15, 20, 25, 30, 35, 40, 45, 50, 55, 60, 65, 70, 75, 80, 85, 86, 87, 88, 89, 90, 91, 92, 93, 94, 95, 96, 97, 98, 99, 99.9, 99.99, or about 99.999 wt % or more of the composition is the one or more crosslinkable viscosifier polymers. In some examples, for a composition including the crosslinkable viscosifier polymer and an aqueous component, about 0.001 wt % to about 50 wt % of the composition is the one or more crosslinkable viscosifier polymers, or about 0.01 wt % to about 10 wt % of the composition, or about 0.001 wt % or less, or about 0.01 wt %, 0.1, 1, 2, 3, 4, 5, 10, 15, 20, 25, 30, 35, 40, 45, or about 50 wt % or more of the composition is the one or more crosslinkable viscosifier polymers.

The crosslinkable viscosifier polymer can have about Z$^1$ mol % of the ethylene repeating unit including the —C(O)NH$_2$ group, wherein Z$^1$ is any suitable mol %, such as about 10% to about 90%, or about 30% to about 50%, or about 10% or less, or about 15%, 20, 22, 24, 26, 28, 30, 32, 34, 36, 38, 40, 42, 44, 46, 48, 50, 52, 54, 56, 58, 60, 62, 64, 68, 68, 70, 75, 80, 85, or about 90% or more. The crosslinkable viscosifier polymer can have about N$^1$ mol % of the ethylene repeating unit including the —S(O)$_2$R$^1$ group, wherein N$^1$ is any suitable mol %, such as about 10% to about 90%, about 30% to about 50%, about 10% or less, or about 15%, 20, 22, 24, 26, 28, 30, 32, 34, 36, 38, 40, 42, 44, 46, 48, 50, 52, 54, 56, 58, 60, 62, 64, 68, 68, 70, 75, 80, 85, or about 90% or more. In some embodiments. Z$^1$+N$^1$ can be about 100%.

In some embodiments, the crosslinkable viscosifier polymer further includes an ethylene repeating unit including a —C(O)OR$^1$ group. At each occurrence, R$^1$ can be independently selected from the group consisting of —H and a suitable counterion. The crosslinkable viscosifier polymer can have about M$^1$ mol % of the ethylene repeating unit including a —C(O)OR$^1$ group, wherein M$^1$ is any suitable mol %, such as about 0% to about 40%, about 0% to about 20%, or about 0%, about 0.001% or less, or about 0.01%, 0.1, 1, 2, 3, 4, 5, 6, 8, 10, 12, 14, 16, 18, 20, 22, 24, 26, 28, 30, 32, 34, 36, 38, or about 40 wt % or more. In some embodiments, Z$^1$+N$^1$+M$^1$ is about 100%.

The crosslinkable viscosifier polymer can have any suitable molecular weight, such as about 5,000,000 g/mol to about 15,000,000 g/mol, about 7,000,000 g/mol to about 10,000,000 g/mol, or about 5,000,000 g/mol or less, or about 5,500,000 g/mol, 6,000,000, 6,500,000, 7,000,000, 7,500,000, 8,000,000, 8,500,000, 9,000,000, 9,500,000, 10,000,000, 10,500,000, 11,000,000, 11,500,000, 12,000,000, 12,500,000, 13,000,000, 13,500,000, 14,000,000, 14,500,000, or about 15,000,000 g/mol or more.

In some embodiments, the crosslinkable viscosifier polymer includes repeating units having the structure:

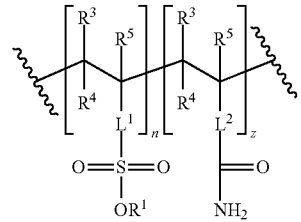

The repeating units are in a block, alternate, or random configuration, and each repeating unit is independently in the orientation shown or in the opposite orientation.

At each occurrence, R$^1$ can be independently selected from the group consisting of —H and a suitable counterion. In some embodiments, at each occurrence, —R$^1$ is independently selected from the group consisting of —H, Na$^+$, K$^+$, Li$^+$, NH$_4^+$, Zn$^+$, Ca$^{2+}$, Zn$^{2+}$, Al$^{3+}$ and Mg$^{2+}$. In some embodiments, at each occurrence, —R$^1$ is —H.

At each occurrence, $R^3$, $R^4$, and $R^5$ can be independently selected from the group consisting of —H and a substituted or unsubstituted $C_1$-$C_5$ hydrocarbyl. At each occurrence, $R^3$, $R^4$, and $R^5$ can be independently selected from the group consisting of —H and a $C_1$-$C_5$ alkyl. At each occurrence, $R^3$, $R^4$, and $R^5$ can be independently selected from the group consisting of —H and a $C_1$-$C_3$ alkyl. In some embodiments, at each occurrence, $R^3$, $R^4$, and $R^5$ are each —H.

At each occurrence, $L^1$ and $L^2$ can be independently selected from the group consisting of a bond and a substituted or unsubstituted $C_1$-$C_{40}$ hydrocarbyl interrupted or terminated with 0, 1, 2, or 3 of at least one of —$NR^3$—, —S—, and —O—. At each occurrence, $L^1$ can be independently selected from the group consisting of a bond, L2, and -(substituted or unsubstituted $C_1$-$C_{20}$ hydrocarbyl)-$NR^3$-(substituted or unsubstituted $C_1$-$C_{20}$ hydrocarbyl)-. At each occurrence. $L^1$ can be independently —C(O)—NH-(substituted or unsubstituted $C_1$-$C_{20}$ hydrocarbyl)-. At each occurrence, $L^1$ can be independently —C(O)—NH—($C_1$-$C_5$ hydrocarbyl)-. In some embodiment, at each occurrence, $L^1$ can be —C(O)—NH—CH(CH$_3$)$_2$—CH$_2$—.

At each occurrence, $L^2$ can be independently selected from the group consisting of a bond and $C_1$-$C_{20}$ hydrocarbyl. At each occurrence. $L^2$, is independently selected from the group consisting of a bond and $C_1$-$C_5$ alkyl. At each occurrence. $L^2$ can be a bond.

The variable n can have any suitable value consistent with $N^1$, the molecular weight of the crosslinkable viscosifier polymer, and the molecular weight of the repeating unit including the —S(O)$_2$R$^1$ group. In some embodiments, n can be about 5,000 to about 75,000, or about 20,000 to about 45,000, or about 5,000 or less, or about 7,500, 10,000, 12,500, 15,000, 17,500, 20,000, 22,500, 25,000, 27,500, 30,000, 32,500, 35,000, 37,500, 40,000, 42,500, 45,000, 47,500, 50,000, 52,500, 55,000, 57,500, 60,000, 62,500, 65,000, 67,500, 70,000, 72,500, or about 75,000 or more. The variable z can have any suitable value consistent with $Z^1$, the molecular weight of the crosslinkable viscosifier polymer, and the molecular weight of the repeating unit including the —C(O)NH$_2$ group. In some embodiments, z is about 2,500 to about 170,000, or about 13,500 to about 65,000, or about 2,500 or less, 5,000, 10,000, 15,000, 20,000, 25,000, 30,000, 35,000, 40,000, 45,000, 50,000, 55,000, 60,000, 65,000, 70,000, 75,000, 80,000, 85,000, 90,000, 95,000, 100,000, 105,000, 110,000, 115,000, 120,000, 125,000, 130,000, 135,000, 140,000, 145,000, 150,000, 155,000, 160,000, 165,000, or about 170,000 or more.

In some embodiments, the crosslinkable viscosifier polymer includes repeating units having the structure:

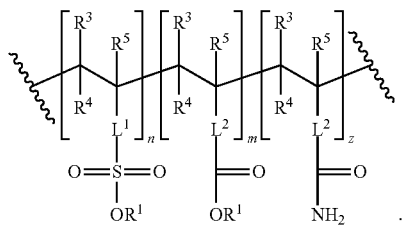

The repeating units are in a block, alternate, or random configuration, and each repeating unit is independently in the orientation shown or in the opposite orientation. The variable m can have any suitable value consistent with $M^1$, the molecular weight of the crosslinkable viscosifier polymer, and the molecular weight of the ethylene repeating unit including a —C(O)OR$^1$ group. In some embodiments, m can be about 0 to about 60,000, or about 5,000 to about 17,000, or about 0, 2,500 or less, 5,000, 7,500, 10,000, 12,500, 15,000, 17,500, 20,000, 22,500, 25,000, 27,500, 30,000, 32,500, 35,000, 37,500, 40,000, 42,500, 45,000, 47,500, 50,000, 52,500, 55,000, 57,500, 60,000, 62,500, or about 65,000 or more.

In some embodiments, the crosslinkable viscosifier polymer includes repeating units having the structure:

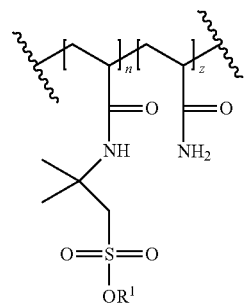

The repeating units are in a block, alternate, or random configuration, and each repeating unit is independently in the orientation shown or in the opposite orientation.

In some embodiments, the crosslinkable viscosifier polymer includes repeating units having the structure:

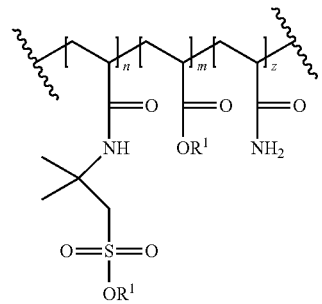

The repeating units are in a block, alternate, or random configuration, and each repeating unit is independently in the orientation shown or in the opposite orientation.

Crosslinker.

The composition including the crosslinkable viscosifier polymer can include one or more crosslinkers. The crosslinker can be any suitable crosslinker, such that the composition can be used as described herein. For example, the crosslinker can be a molecule including at least one of chromium, aluminum, antimony, zirconium, titanium, calcium, boron, iron, silicon, copper, zinc, magnesium, and an ion thereof. The crosslinker can be at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate.

In some embodiments, the crosslinker includes zirconium or a zirconium derivative. The crosslinker can include at least one of zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate.

The composition can include any suitable concentration of the one or more crosslinkers. For example, 0.000,1 wt % to about 80 wt % of the composition can be the one or more crosslinkers, or about 0.001 wt % to about 80 wt %, 10 wt % to about 30 wt %, or about 0.000,1 wt % or less, or about 0.001 wt %, 0.01, 0.1, 1, 2, 3, 4, 5, 10, 15, 20, 25, 30, 35, 40, 45, 50, 55, 60, 65, 70, 75, or about 80 wt % or more of the composition can be the one or more crosslinkers. In some examples, in embodiments of the composition including an aqueous composition, about 0.000,1 wt % to about 50 wt % of the composition is the crosslinker, or about 0.001 wt % to about 1 wt %, or about 0.000,1 wt % or less, or about 0.001 wt %, 0.01, 0.1, 1, 2, 3, 4, 5, 10, 15, 20, 25, 30, 35, 40, 45, or about 50 wt % or more of the composition.

Other Components.

In various embodiments, the composition including the crosslinkable viscosifier polymer and the crosslinker can further include one or more suitable additional components. The additional components can be any suitable additional components, such that the composition can be used as described herein.

The composition can further include one or more fluids. The composition can include a fluid including at least one of water, an organic solvent, and an oil. The composition can include a fluid including at least one of dipropylene glycol methyl ether, dipropylene glycol dimethyl ether, dimethyl formamide, diethylene glycol methyl ether, ethylene glycol butyl ether, diethylene glycol butyl ether, propylene carbonate, D-limonene, a $C_2$-$C_{40}$ fatty acid $C_1$-$C_{10}$ alkyl ester, 2-butoxy ethanol, butyl acetate, furfuryl acetate, dimethyl sulfoxide, dimethyl formamide, diesel, kerosene, mineral oil, a hydrocarbon including an internal olefin, a hydrocarbon including an alpha olefin, xylenes, an ionic liquid, methyl ethyl ketone, and cyclohexanone. The composition can further include at least one of water, brine, produced water, flowback water, brackish water, and sea water. The composition can include any suitable proportion of the one or more fluids, such as about 0.001 wt % to 99.999 wt %, about 0.01 wt % to about 99.99 wt %, about 0.1 wt % to about 99.9 wt %, or about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, or about 99.999 wt % or more of the composition.

The composition can further include a secondary viscosifier, in addition to the crosslinkable viscosifier polymer. The secondary viscosifier can be present in any suitable concentration, such as more, less, or an equal concentration as compared to the concentration of the crosslinkable viscosifier polymer. The secondary viscosifier can include at least one of a substituted or unsubstituted polysaccharide, and a substituted or unsubstituted polyalkenylene, wherein the substituted or unsubstituted polysaccharide or polyalkenylene is crosslinked or uncrosslinked. The secondary viscosifier can include a polymer including at least one monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The secondary viscosifier can include a crosslinked gel or a crosslinkable gel.

The secondary viscosifier can affect the viscosity of the composition at any suitable time and location. In some embodiments, the secondary viscosifier provides an increased viscosity at least one of before placement in the subterranean formation, at the time of placement into the subterranean formation, during travel downhole, once the composition reaches a particular downhole location, or some period of time after the composition reaches a particular location downhole. In some embodiments, the secondary viscosifier can provide some or no increased viscosity until the secondary viscosifier reaches a desired location downhole, at which point the secondary viscosifier can provide a small or large increase in viscosity.

In some embodiments, the secondary viscosifier includes at least one of a linear polysaccharide, and poly(($C_2$-$C_{10}$)alkenylene), wherein at each occurrence, the ($C_2$-$C_{10}$)alkenylene is independently substituted or unsubstituted. In some embodiments, the secondary viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly (hydroxyethyl methacrylate), alginate, chitosan, curdlan, dextran, emulsan, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, welan, derivatized starch, tamarind, tragacanth, guar gum, derivatized guar (e.g., hydroxypropyl guar, carboxy methyl guar, or carboxymethyl hydroxylpropyl guar), gum ghatti, gum arabic, locust bean gum, and derivatized cellulose (e.g., carboxymethyl cellulose, hydroxyethyl cellulose, carboxymethyl hydroxyethyl cellulose, hydroxypropyl cellulose, or methyl hydroxyl ethyl cellulose).

In some embodiments, the secondary viscosifier can include a poly(vinyl alcohol) homopolymer, poly(vinyl alcohol) copolymer, a crosslinked poly(vinyl alcohol) homopolymer, and a crosslinked poly(vinyl alcohol) copolymer. The secondary viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstitued ($C_2$-$C_{50}$)hydrocarbyl having at least one aliphatic unsaturated C—C bond therein, and a substituted or unsubstituted ($C_2$-$C_{50}$)alkene. The secondary viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The secondary viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen containing substituted or unsubstituted ($C_1$-$C_{10}$)heterocycle. The secondary viscosifier can include a poly(vinyl alcohol) copolymer or a crosslinked poly(vinyl alcohol) copolymer including at least one of a graft, linear, branched, block, and random copolymer that includes a poly(vinylalcohol)-poly(acrylamide) copolymer, a poly(vinylalcohol)-poly(2-acrylamido-2-methylpropanesulfonic acid) copolymer, or a poly(vinylalcohol)-poly(N-vinylpyrrolidone) copolymer. The secondary viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The secondary viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin. The composition can include any suitable proportion of the secondary viscosifier, such as about 0.001 wt % to 99.999 wt %, about 0.01 wt % to about 99.99 wt %, about 0.1 wt % to about 50 wt %, or about 0.1 wt % to about 20 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, or about 99.999 wt % or more of the composition.

The composition can further include a secondary crosslinker. The crosslinker can be any suitable crosslinker. The secondary crosslinker can be present in any suitable concentration, such as more, less, or an equal concentration as compared to the concentration of the crosslinker. In various embodiments, the secondary crosslinker can include at least one of chromium, aluminum, antimony, zirconium, titanium, calcium, boron, iron, silicon, copper, zinc, magnesium, and an ion thereof. The secondary crosslinker can include at least one of boric acid, borax, a borate, a ($C_1$-$C_{30}$)hydrocarbylboronic acid, a ($C_1$-$C_{30}$)hydrocarbyl ester of a ($C_1$-$C_{30}$) hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. The composition can include any suitable proportion of the secondary crosslinker, such as about 0.000,1 wt % to 99.999,9 wt %, about 0.01 wt % to about 99.99 wt %, about 0.1 wt % to about 50 wt %, or about 0.1 wt % to about 20 wt %, or about 0.000,1 wt % or less, or about 0.001 wt %, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999, or about 99.999,9 wt % or more of the composition.

The composition including the crosslinkable viscosifier polymer and the crosslinker, or a crosslinked reaction product thereof, can be combined with any suitable downhole fluid before, during, or after the placement of the composition in the subterranean formation or the contacting of the composition and the subterranean material. In some examples, the composition including the crosslinkable viscosifier polymer and the crosslinker, or a crosslinked reaction product thereof, is combined with a downhole fluid above the surface, and then the combined composition is placed in a subterranean formation or contacted with a subterranean material. In another example, the composition including the crosslinkable viscosifier polymer and the crosslinker, or a crosslinked reaction product thereof, is injected into a subterranean formation to combine with a downhole fluid, and the combined composition is contacted with a subterranean material or is considered to be placed in the subterranean formation. In various examples, at least one of prior to, during, and after the placement of the composition in the subterranean formation or contacting of the subterranean material and the composition, the composition is used downhole, at least one of alone and in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof.

In various embodiments, the method includes combining the composition including the crosslinkable viscosifier polymer and the crosslinker, or a crosslinked reaction product thereof, with any suitable downhole fluid, such as an aqueous or oil-based fluid including a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof, to form a mixture. The placement of the composition in the subterranean formation can include contacting the subterranean material and the mixture. The contacting of the subterranean material and the composition can include contacting the subterranean material and the mixture. Any suitable weight percent of a mixture that is placed in the subterranean formation or contacted with the subterranean material can be the composition including the crosslinkable viscosifier polymer and the crosslinker, or a crosslinked reaction product thereof, such as about 0.001 wt % to 99.999 wt %, about 0.01 wt % to about 99.99 wt %, about 0.1 wt % to about 99.9 wt %, or about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the mixture or composition.

In some embodiments, the composition can include any suitable amount of any suitable material used in a downhole fluid. For example, the composition can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts, fibers, thixotropic additives, breakers, crosslinkers, rheology modifiers, curing accelerators, curing retarders, pH modifiers, chelating agents, scale inhibitors, enzymes, resins, water control materials, oxidizers, markers. Portland cement, pozzolana cement, gypsum cement, high alumina content cement, slag cement, silica cement, fly ash, metakaolin, shale, zeolite, a crystalline silica compound, amorphous silica, hydratable clays, microspheres, pozzolan lime, or a combination thereof. In various embodiments, the composition can include one or more additive components such as: thinner additives such as COLDTROL®, ATC®, OMC 2™, and OMC 42™; RHEMOD™, a viscosifier and suspension agent including a modified fatty acid; additives for providing temporary increased viscosity, such as for shipping (e.g., transport to the well site) and for use in sweeps (for example, additives having the trade name TEMPERUS™ (a modified fatty acid) and VIS-PLUS®, a thixotropic viscosifying polymer blend); TAU-MOD™, a viscosifying/suspension agent including an amorphous/fibrous material; additives for filtration control, for example, ADAPTA®, a HTHP filtration control agent including a crosslinked copolymer; DURATONE® HT, a filtration control agent that includes an organophilic lignite, more particularly organophilic leonardite; THERMO TONE™, a high temperature high pressure (HTHP) filtration control agent including a synthetic polymer; BDF™-366, a HTHP filtration control agent; BDF™-454, a HTHP filtration control agent; LIQUITONE™, a polymeric filtration agent and viscosifier; additives for HTHP emulsion stability, for example, FACTANT™, which includes highly concentrated tall oil derivative; emulsifiers such as LE SUPERMUL™ and EZ MUL® NT, polyaminated fatty acid emulsifiers, and FORTI-MUL®; DRIL TREAT®, an oil wetting agent for heavy fluids; BARAC-ARB®, a sized ground marble bridging agent; BAROID®, a ground barium sulfate weighting agent; BAROLIFT®, a hole sweeping agent; SWEEP-WATE®, a sweep weighting agent; BDF-508, a diamine dimer rheology modifier; GELTONE® II organophilic clay; BAROFIBRE™ O for lost circulation management and seepage loss prevention, including a natural cellulose fiber; STEELSEAL®, a resilient graphitic carbon lost circulation material; HYDRO-PLUG®, a hydratable swelling lost circulation material; lime, which can provide alkalinity and can activate certain emulsifiers; and calcium chloride, which can provide salinity. Any suitable proportion of the composition can include any optional component listed in this paragraph, such as about 0.000,1 wt % to 99.999,9 wt %, about 0.01 wt % to about 99.99 wt %, about 0.1 wt % to about 99.9 wt %, or about 20 wt % to about 90 wt %, or about 0.000,1 wt % or less, or about 0.001 wt %, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999 wt %, or 99.999,9 wt % or more of the composition.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reduce friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A drilling fluid can be present in the mixture with the composition including the crosslinkable viscosifier polymer and the crosslinker, or a crosslinked reaction product thereof, in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, 99.999, or about 99.999,9 wt % or more of the mixture.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g., barium sulfate), surfactants (e.g., betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g., silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture.

An oil-based drilling fluid or mud in embodiments of the present invention can be any suitable oil-based drilling fluid. In various embodiments the drilling fluid can include at least one of an oil-based fluid (or synthetic fluid), saline, aqueous solution, emulsifiers, other agents of additives for suspension control, weight or density control, oil-wetting agents, fluid loss or filtration control agents, and rheology control agents. For example, see H. C. H. Darley and George R. Gray, Composition and Properties of Drilling and Completion Fluids 66-67, 561-562 (5$^{th}$ ed. 1988). An oil-based or invert emulsion-based drilling fluid can include between about 10:90 to about 95:5, or about 50:50 to about 95:5, by volume of oil phase to water phase. A substantially all oil mud includes about 100% liquid phase oil by volume (e.g., substantially no internal aqueous phase).

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

A cement fluid can include an aqueous mixture of at least one of cement and cement kiln dust. The composition including the crosslinkable viscosifier polymer and the crosslinker, or a crosslinked reaction product thereof, can form a useful combination with cement or cement kiln dust. The cement kiln dust can be any suitable cement kiln dust. Cement kiln dust can be formed during the manufacture of cement and can be partially calcined kiln feed that is removed from the gas stream and collected in a dust collector during a manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the present invention; for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in embodiments of the present invention are classified as Classes A, C, H, and G cements according to the American Petroleum Institute, *API Specification for Materials and Testing for Well Cements*. API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, 0-95 wt %, 20-95 wt %, or about 50-90 wt %. A cement kiln dust can be present in an amount of at least about 0.01 wt %, or about 5 wt %-80 wt %, or about 10 wt % to about 50 wt %.

Optionally, other additives can be added to a cement or kiln dust-containing composition of embodiments of the present invention as deemed appropriate by one skilled in the art, with the benefit of this disclosure. Any optional ingredient listed in this paragraph can be either present or not present in the composition. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

In various embodiments, the composition or mixture can include a proppant, a resin-coated proppant, an encapsulated resin, or a combination thereof. A proppant is a material that keeps an induced hydraulic fracture at least partially open during or after a fracturing treatment. Proppants can be transported downhole to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ available from DuPont), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition or mixture can include any suitable amount of proppant, such as about 0.000,1 wt % to about 99.9 wt %, about 0.1 wt % to about 80 wt %, or about 10 wt % to about 60 wt %, or about 0.000,000,01 wt % or less, or about 0.000,001 wt %, 0.000,1, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9 wt %, or about 99.99 wt % or more.

Drilling Assembly.

Embodiments of the composition including the crosslinkable viscosifier polymer and the crosslinker, or a crosslinked reaction product thereof, disclosed herein may directly or indirectly affect one or more components or pieces of equipment associated with the preparation, delivery, recapture, recycling, reuse, and/or disposal of the composition including crosslinkable viscosifier polymer and the crosslinker, or a crosslinked reaction product thereof. For example, and with reference to FIG. 1, an embodiment of the composition including the crosslinkable viscosifier polymer and the crosslinker, or a crosslinked reaction product thereof, and optionally also including a drilling fluid, may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

The composition including the crosslinkable viscosifier polymer and the crosslinker, or a crosslinked reaction product thereof, may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the composition including the crosslinkable viscosifier polymer and the crosslinker, or a crosslinked reaction product thereof, may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the composition including the crosslinkable viscosifier polymer and the crosslinker, or a crosslinked reaction product thereof, may be stored, reconditioned, and/or regulated until added to the drilling fluid 122.

As mentioned above, the composition including the crosslinkable viscosifier polymer and the crosslinker, or a crosslinked reaction product thereof, may directly or indirectly affect the components and equipment of the drilling assembly 100. For example, the composition including the crosslinkable viscosifier polymer and the crosslinker, or a crosslinked reaction product thereof, may directly or indirectly affect the fluid processing unit(s) 128, which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 may further include one or more sensors, gauges, pumps, compressors, and the like used to store, monitor, regulate, and/or recondition the composition including the crosslinkable viscosifier polymer and the crosslinker, or a crosslinked reaction product thereof.

The composition including the crosslinkable viscosifier polymer and the crosslinker, or a crosslinked reaction product thereof, may directly or indirectly affect the pump 120, which representatively includes any conduits, pipelines, trucks, tubulars, and/or pipes used to fluidically convey the composition including the crosslinkable viscosifier polymer and the crosslinker, or a crosslinked reaction product thereof, downhole, any pumps, compressors, or motors (e.g., topside or downhole) used to drive the composition into motion, any valves or related joints used to regulate the pressure or flow rate of the composition, and any sensors (e.g., pressure, temperature, flow rate, and the like), gauges, and/or combinations thereof, and the like. The composition including the crosslinkable viscosifier polymer and the crosslinker, or a crosslinked reaction product thereof, may also directly or indirectly affect the mixing hopper 134 and the retention pit 132 and their assorted variations.

The composition including the crosslinkable viscosifier polymer and the crosslinker, or a crosslinked reaction product thereof, may also directly or indirectly affect the various downhole equipment and tools that may come into contact with the composition including the crosslinkable viscosifier polymer and the crosslinker, or a crosslinked reaction product thereof, such as, but not limited to, the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The composition including the crosslinkable viscosifier polymer and the crosslinker, or a crosslinked reaction product thereof, may also directly or indirectly affect any downhole heat exchangers, valves and corresponding actuation devices, tool seals, packers and other wellbore isolation devices or components, and the like associated with the wellbore 116. The composition including the crosslinkable viscosifier polymer and the crosslinker, or a crosslinked reaction product thereof, may also directly or indirectly affect the drill bit 114, which may include, but is not limited to, roller cone bits, polycrystalline diamond compact (PDC) bits, natural diamond bits, any hole openers, reamers, coring bits, and the like.

While not specifically illustrated herein, the composition including the crosslinkable viscosifier polymer and the crosslinker, or a crosslinked reaction product thereof, may also directly or indirectly affect any transport or delivery equipment used to convey the composition including the crosslinkable viscosifier polymer and the crosslinker, or a crosslinked reaction product thereof, to the drilling assembly 100 such as, for example, any transport vessels, conduits, pipelines, trucks, tubulars, and/or pipes used to fluidically move the composition including the crosslinkable viscosifier polymer and the crosslinker, or a crosslinked reaction product thereof, from one location to another, any pumps, compressors, or motors used to drive the composition into motion, any valves or related joints used to regulate the pressure or flow rate of the composition, and any sensors (e.g., pressure and temperature), gauges, and/or combinations thereof, and the like.

System or Apparatus.

In various embodiments, the present invention provides a system. The system can be any suitable system that can include the use of an embodiment of the composition including the crosslinkable viscosifier polymer and the crosslinker described herein, or a crosslinked reaction product thereof, in a subterranean formation, or that can include performance of an embodiment of a method of using the composition described herein. The system can include a composition including an embodiment of the crosslinkable viscosifier polymer and the crosslinker. The system can also include a subterranean formation including the composition therein. In some embodiments, the composition in the system can also include a downhole fluid, such as at least one of an aqueous fracturing fluid and an aqueous drilling fluid.

In some embodiments, the system can include a drillstring disposed in a wellbore, the drillstring including a drill bit at a downhole end of the drillstring. The system can include an annulus between the drillstring and the wellbore. The system can also include a pump configured to circulate the composition through the drill string, through the drill bit, and back above-surface through the annulus. The system can include a fluid processing unit configured to process the composition exiting the annulus to generate a cleaned drilling fluid for recirculation through the wellbore. In some embodiments, the system can include a tubular disposed in a wellbore, and a pump configured to pump the composition downhole.

In various embodiments, the present invention provides an apparatus. The apparatus can be any suitable apparatus that can use an embodiment of the composition described herein or that can be used to perform an embodiment of a method described herein.

Various embodiments provide systems and apparatus configured for delivering the composition described herein to a downhole location and for using the composition therein, such as for drilling or hydraulic fracturing. In various embodiments, the system can include a pump fluidly coupled to a tubular (e.g., any suitable type of oilfield pipe, such as pipeline, drill pipe, production tubing, and the like), the tubular containing a composition including the crosslinkable viscosifier polymer and the crosslinker, or a crosslinked reaction product thereof, described herein.

The pump can be a high pressure pump in some embodiments. As used herein, the term "high pressure pump" will refer to a pump that is capable of delivering a fluid downhole at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include, but are not limited to, floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery downhole.

Figure 2:
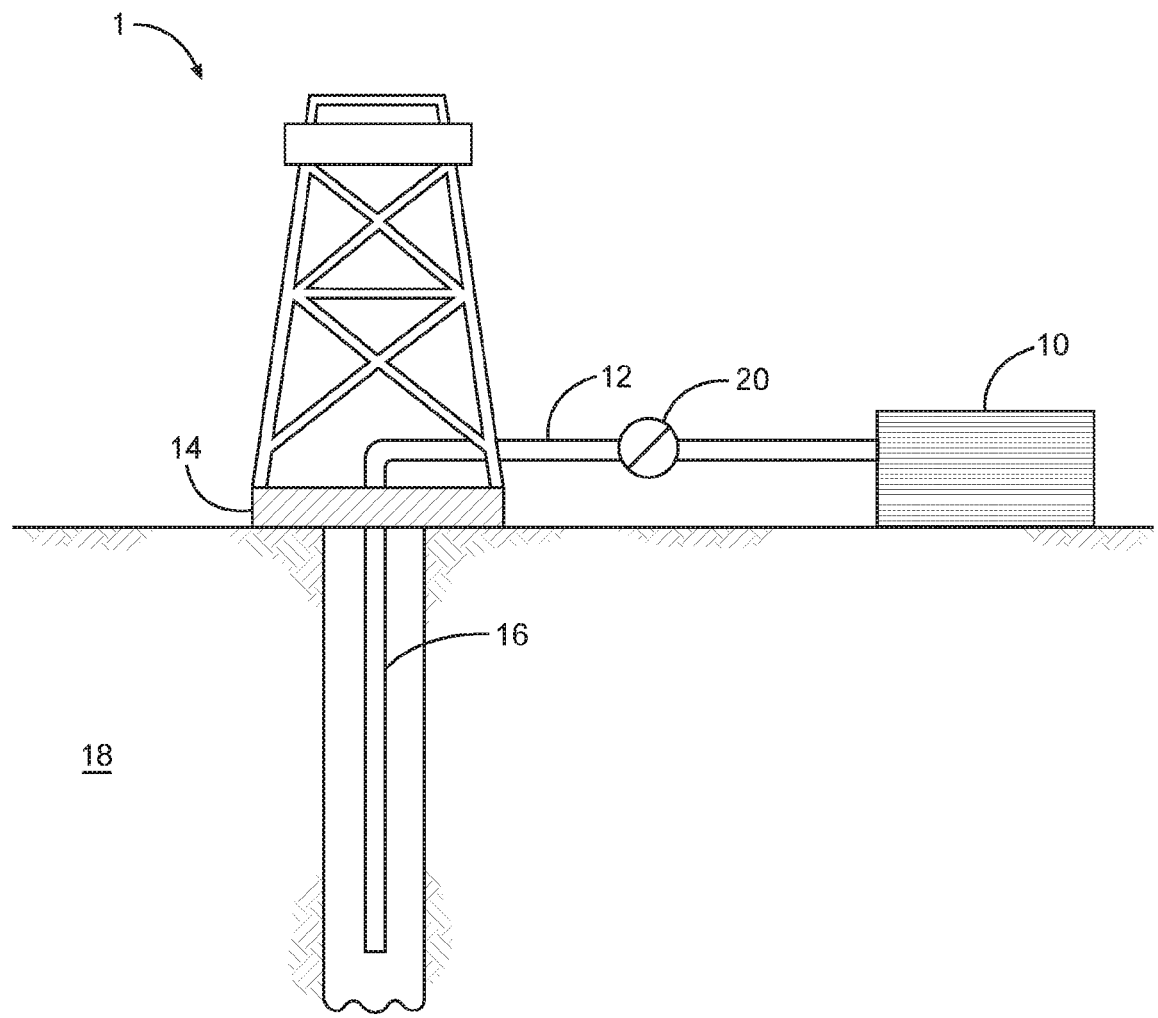
FIG. 2 illustrates a system or apparatus for delivering a composition downhole, in accordance with various embodiments.

FIG. 2 shows an illustrative schematic of systems and apparatuses that can deliver embodiments of the compositions of the present invention to a downhole location, according to one or more embodiments. It should be noted that while FIG. 2 generally depicts a land-based system or apparatus, it is to be recognized that like systems and apparatuses can be operated in subsea locations as well. Embodiments of the present invention can have a different scale than that depicted in FIG. 2. As depicted in FIG. 2, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 2 in the interest of clarity. Non-limiting additional components that can be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the composition can, in some embodiments, flow back to wellhead 14 and exit subterranean formation 18. In some embodiments, the composition that has flowed back to wellhead 14 can subsequently be recovered, and in some examples reformulated, and recirculated to subterranean formation 18.

It is also to be recognized that the disclosed composition can also directly or indirectly affect the various downhole equipment and tools that can come into contact with the composition during operation. Such equipment and tools can include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 2.

Composition for Treatment of a Subterranean Formation.

Various embodiments provide a composition for treatment of a subterranean formation. The composition can be any suitable composition including an embodiment of the crosslinkable viscosifier polymer and the crosslinker, or a crosslinked reaction product thereof, that can be used to perform an embodiment of the method for treatment of a subterranean formation described herein. Various embodiments provide a crosslinked reaction product of an embodiment of the composition herein, wherein at least some of the crosslinkable viscosifier polymer has reacted with at least some of the crosslinker to form a crosslinked product.

For example, the composition can include a crosslinkable viscosifier polymer having about $Z^1$ mol % of an ethylene repeating unit including a —C(O)NH$_2$ group, about $N^1$ mol % of an ethylene repeating unit including an —S(O)$_2$OR$^1$ group, and about $M^1$ mol % of an ethylene repeating unit including a —C(O)OR$^1$ group, wherein the repeating units are in block, alternate, or random configuration. At each occurrence, R$^1$ can be independently selected from the group consisting of —H and a counterion. The variable $Z^1$ can be about 10% to about 90%, $N^1$ can be about 10% to about 90%, and $M^1$ can be about 0% to about 40%. The crosslinkable viscosifier polymer can have a molecular weight of about 5,000,000 g/mol to about 15,000,000 g/mol. The composition can include a crosslinker including at least one of zirconium and a zirconium derivative. The system can include a subterranean formation including the composition therein.

In some embodiments, the crosslinkable viscosifier polymer includes repeating units having the structure:

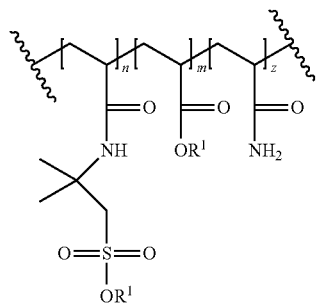

The repeating units are in a block, alternate, or random configuration, and each repeating unit is independently in the orientation shown or in the opposite orientation. At each occurrence, R$^1$ can be independently selected from the group consisting of —H and a counterion. The crosslinkable viscosifier polymer can have a molecular weight of about 5,000,000 g/mol to about 15,000,000 g/mol. The variable n can be about 5,000 to about 75,000, z can be about 2,500 to about 170,000, and m can be about 0 to about 60,000. The composition can include a downhole fluid including at least one of an aqueous drilling fluid and an aqueous fracturing fluid, wherein about 0.01 wt % about 10 wt % of the composition is the crosslinkable viscosifier polymer and the crosslinker, and the remainder is the downhole fluid and other optional components.

Method for Preparing a Composition for Treatment of a Subterranean Formation.

In various embodiments, the present invention provides a method for preparing a composition for treatment of a subterranean formation. The method can be any suitable method that produces an embodiment of the composition including the crosslinkable viscosifier polymer and the crosslinker described herein. For example, the method can include forming a composition including an embodiment of the crosslinkable viscosifier polymer and the crosslinker, and a downhole fluid such as at least one of an aqueous drilling fluid and an aqueous fracturing fluid.

EXAMPLES

Various embodiments of the present invention can be better understood by reference to the following Examples which are offered by way of illustration. The present invention is not limited to the Examples given herein.

Example 1

Sample Polymer Solution Preparation and Heat Treatment

Two sample polymer solutions were prepared by dissolving 0.7 ppb (pounds per barrel) of an acrylamide copolymer (having 40 mol % acrylamide-drived monomers, 40 mol % acrylamidopropanesulfonic acid-derived monomers, and about 10 mol % acrylic acid-derived monomers, with an average molecular weight of about 7-10 million daltons) and 0.175 ppb of a zirconium-derivative crosslinker (0.175 ppb cross-linker) in water. The sample polymer solutions were aged in an oven at 200° F. or 225° F. for 16 hours.

Example 2

Viscosity Measurements of Heat-Treated Sample Polymer Solutions

Figure 3:
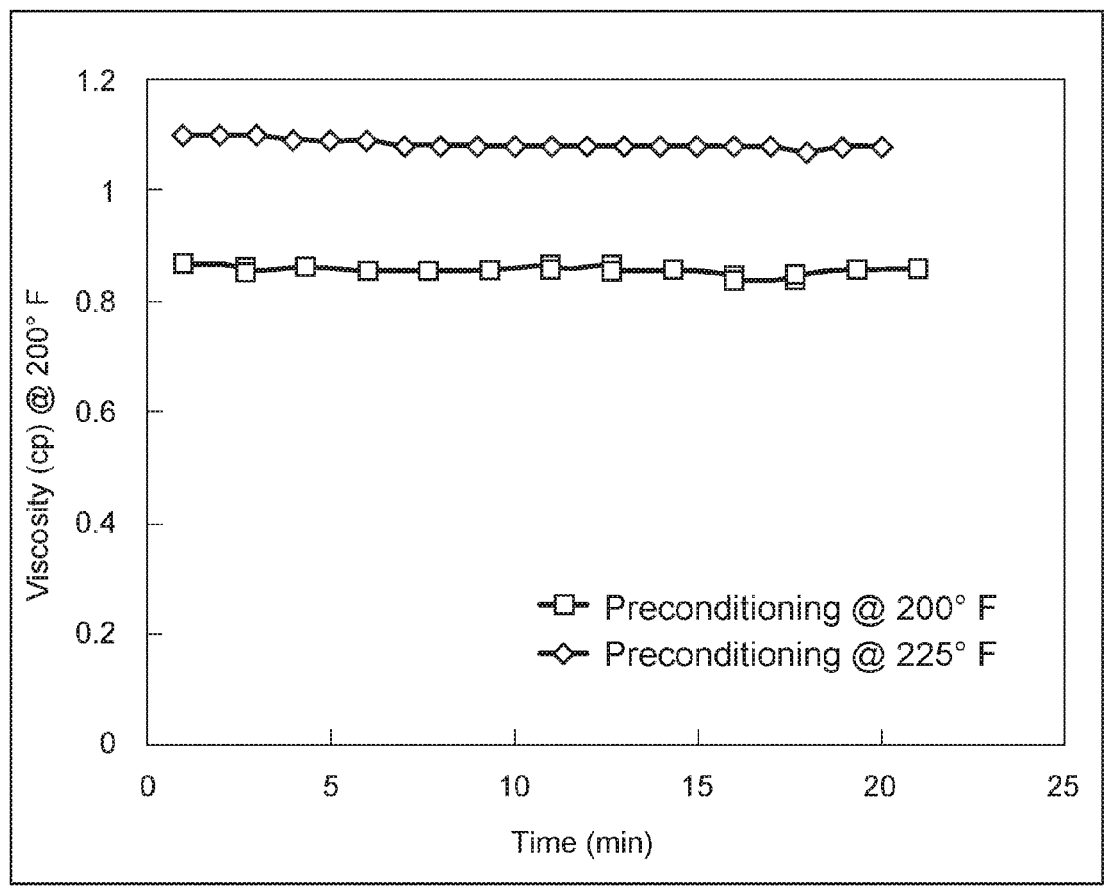
FIG. 3 illustrates viscosity versus time for temperature-treated polymer samples, according to various embodiments.

Viscosity of the heat-treated polymer samples were measured by an advanced Rheometer (Anton Paar) at 200° F. using a shear rate of 100 s$^{-1}$ and at standard pressure, with the results shown in FIG. 3.

As compared to the viscosity provided by the polymer sample receiving a temperature treatment at 200° F., the polymer sample with the 225° F. temperature treatment provided a viscosity that was about 30% greater due to increased crosslinking caused by the higher temperatures.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:
 obtaining or providing a composition comprising
  a crosslinkable viscosifier polymer comprising an ethylene repeating unit comprising a —C(O)NH$_2$ group and an ethylene repeating unit comprising an —S(O)$_2$OR$^1$ group, wherein
   at each occurrence R$^1$ is independently selected from the group consisting of —H and a counterion, and
   the repeating units are in block, alternate, or random configuration; and
  at least one crosslinker; and
 placing the composition in a subterranean formation downhole.

Embodiment 2 provides the method of Embodiment 1, wherein the obtaining or providing of the composition occurs above-surface.

Embodiment 3 provides the method of any one of Embodiments 1-3, wherein the obtaining or providing of the composition occurs downhole.

Embodiment 4 provides the method of any one of Embodiments 1-4, wherein the method is a method of drilling the subterranean formation.

Embodiment 5 provides the method of any one of Embodiments 1-5, wherein the method is a method of fracturing the subterranean formation.

Embodiment 6 provides the method of any one of Embodiments 1-6, wherein the composition includes an aqueous liquid.

Embodiment 7 provides the method of Embodiment 6, wherein the method further comprises mixing the aqueous liquid with the polymer viscosifier and the crosslinker.

Embodiment 8 provides the method of Embodiment 7, wherein the mixing occurs above surface.

Embodiment 9 provides the method of Embodiment 8, wherein the mixing occurs downhole.

Embodiment 10 provides the method of any one of Embodiments 6-9, wherein the aqueous liquid comprises at least one of water, brine, produced water, flowback water, brackish water, and sea water.

Embodiment 11 provides the method of any one of Embodiments 6-10, wherein the aqueous liquid comprises salt water having a total dissolved solids level of about 1,000 mg/L to about 250,000 mg/L.

Embodiment 12 provides the method of any one of Embodiments 6-11, wherein the salt water has a total dissolved solids level of at least about 25,000 mg/L.

Embodiment 13 provides the method of any one of Embodiments 6-12, wherein the aqueous liquid comprises at least one of an aqueous drilling fluid and an aqueous fracturing fluid.

Embodiment 14 provides the method of any one of Embodiments 1-13, further comprising at least partially crosslinking the crosslinkable viscosifier polymer to provide a crosslinked viscosifier polymer.

Embodiment 15 provides the method of Embodiment 14, wherein the crosslinking occurs above-surface.

Embodiment 16 provides the method of any one of Embodiments 14-15, wherein the crosslinking occurs downhole.

Embodiment 17 provides the method of any one of Embodiments 14-16, wherein the crosslinking is at least partially triggered by an increase in temperature.

Embodiment 18 provides the method of Embodiment 17, wherein the increase in temperature is at least partially due to placement of the composition in the subterranean formation.

Embodiment 19 provides the method of any one of Embodiments 14-18, wherein crosslinking comprises exposing the composition to a temperature of about 150° F. to about 300° F.

Embodiment 20 provides the method of any one of Embodiments 14-19, wherein crosslinking comprises exposing the composition to a temperature of about 175° F. to about 250° F.

Embodiment 21 provides the method of any one of Embodiments 14-20, wherein after the crosslinking the viscosity of the composition, at standard temperature and pressure and at a shear rate of about 50 $s^{-1}$ to about 500 $s^{-1}$, is about 10 cP to about 1,000,000 cP.

Embodiment 22 provides the method of any one of Embodiments 14-21, wherein after the crosslinking the viscosity of the composition, at standard temperature and pressure and at a shear rate of about 0 $s^{-1}$ to about 1 $s^{-1}$, is about 10 cP to about 1,000,000 cP.

Embodiment 23 provides the method of any one of Embodiments 14-22, wherein after the crosslinking the viscosity of the composition, at standard temperature and pressure and at a shear rate of about 50 $s^{-1}$ to about 500 $s^{-1}$, is about 1,000 cP to about 100,000 cP.

Embodiment 24 provides the method of any one of Embodiments 14-23, wherein prior to the crosslinking, the viscosity of the composition, at standard temperature and pressure and at a shear rate of about 50 $s^{-1}$ to about 500 $s^{-1}$, is about 0.01 cP to about 1,000,000 cP.

Embodiment 25 provides the method of any one of Embodiments 14-24, wherein prior to the crosslinking, the viscosity of the composition, at standard temperature and pressure and at a shear rate of about 50 $s^{-1}$ to about 500 $s^{-1}$, is about 0.01 cP to about 10,000 cP.

Embodiment 26 provides the method of any one of Embodiments 1-25, wherein about 0.001 wt % to about 95 wt % of the composition is the crosslinkable viscosifier polymer.

Embodiment 27 provides the method of any one of Embodiments 1-26, wherein about 70 wt % to about 90 wt % of the composition is the crosslinkable viscosifier polymer.

Embodiment 28 provides the method of any one of Embodiments 6-27, wherein about 0.01 wt % to about 50 wt % of the composition is the crosslinkable viscosifier polymer.

Embodiment 29 provides the method of any one of Embodiments 6-28, wherein about 0.01 wt % to about 10 wt % of the composition is the crosslinkable viscosifier polymer.

Embodiment 30 provides the method of any one of Embodiments 1-29, wherein the crosslinkable viscosifier polymer further comprises an ethylene repeating unit comprising a —C(O)OR$^1$ group.

Embodiment 31 provides the method of any one of Embodiments 1-30, wherein the crosslinkable viscosifier polymer has about Z$^1$ mol % of the ethylene repeating unit comprising the —C(O)NH$_2$ group and has about N$^1$ mol % of the ethylene repeating unit comprising the —S(O)$_2$R$^1$ group, wherein Z$^1$ is about 10% to about 90%, and N$^1$ is about 10% to about 90%.

Embodiment 32 provides the method of Embodiment 31, wherein Z$^1$ is about 30% to about 50%, and N$^1$ is about 30% to about 50%.

Embodiment 33 provides the method of any one of Embodiments 31-32, wherein Z$^1$+N$^1$ is about 100%.

Embodiment 34 provides the method of any one of Embodiments 31-33, wherein the crosslinkable viscosifier polymer further comprises about M$^1$ mol % of an ethylene repeating unit comprising a —C(O)OR$^1$ group, wherein M$^1$ is about 0% to about 40%.

Embodiment 35 provides the method of Embodiment 34, wherein M$^1$ is about 0% to about 20%

Embodiment 36 provides the method of any one of Embodiments 34-35, wherein Z$^1$+N$^1$+M$^1$ is about 100%.

Embodiment 37 provides the method of any one of Embodiments 1-36, wherein the crosslinkable viscosifier polymer has a molecular weight of about 5,000,000 g/mol to about 15,000,000 g/mol.

Embodiment 38 provides the method of any one of Embodiments 1-37, wherein the crosslinkable viscosifier polymer has a molecular weight of about 7,000,000 g/mol to about 10,000,000 g/mol.

Embodiment 39 provides the method of any one of Embodiments 1-38, wherein the crosslinkable viscosifier polymer comprises repeating units having the structure:

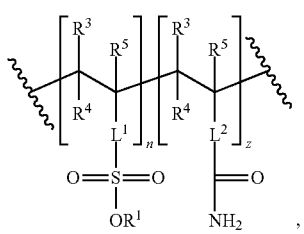

wherein
at each occurrence $R^3$, $R^4$, and $R^5$ are independently selected from the group consisting of —H and a substituted or unsubstituted $C_1$-$C_5$ hydrocarbyl
at each occurrence $L^1$ and $L^2$ are independently selected from the group consisting of a bond and a substituted or unsubstituted $C_1$-$C_{40}$ hydrocarbyl interrupted or terminated with 0, 1, 2, or 3 of at least one of —$NR^3$—, —S—, and —O—,
the repeating units are in a block, alternate, or random configuration, and each repeating unit is independently in the orientation shown or in the opposite orientation.

Embodiment 40 provides the method of Embodiment 39, wherein at each occurrence $L^1$ is independently selected from the group consisting of a bond, L2, and -(substituted or unsubstituted $C_1$-$C_{20}$ hydrocarbyl)-$NR^3$-(substituted or unsubstituted $C_1$-$C_{20}$ hydrocarbyl)-Embodiment 41 provides the method of any one of Embodiments 39-40, wherein at each occurrence $L^1$ is independently —C(O)—NH-(substituted or unsubstituted $C_1$-$C_{20}$ hydrocarbyl)-Embodiment 42 provides the method of any one of Embodiments 39-41, wherein at each occurrence $L^1$ is independently —C(O)—NH—($C_1$-$C_5$ hydrocarbyl)-Embodiment 43 provides the method of any one of Embodiments 39-42, wherein $L^1$ is —C(O)—NH—CH(CH$_3$)$_2$—CH$_2$—.

Embodiment 44 provides the method of any one of Embodiments 39-43, wherein at each occurrence $L^2$ is independently selected from the group consisting of a bond and $C_1$-$C_{20}$ hydrocarbyl.

Embodiment 45 provides the method of any one of Embodiments 39-44, wherein at each occurrence $L^2$ is independently selected from the group consisting of a bond and $C_1$-$C_5$ alkyl.

Embodiment 46 provides the method of any one of Embodiments 39-45, wherein at each occurrence $L^2$ is a bond.

Embodiment 47 provides the method of any one of Embodiments 39-46, wherein at each occurrence $R^3$, $R^4$, and $R^5$ are independently selected from the group consisting of —H and a $C_1$-$C_5$ alkyl.

Embodiment 48 provides the method of any one of Embodiments 39-47, wherein at each occurrence $R^3$, $R^4$, and $R^5$ are independently selected from the group consisting of —H and a $C_1$-$C_3$ alkyl.

Embodiment 49 provides the method of any one of Embodiments 39-48, wherein at each occurrence $R^3$, $R^4$, and $R^5$ are each —H.

Embodiment 50 provides the method of any one of Embodiments 39-49, wherein at each occurrence —$R^1$ is independently selected from the group consisting of —H, Na$^+$, K$^+$, Li$^+$, NH$_4^+$, Zn$^+$, Ca$^{2+}$, Zn$^{2+}$, Al$^{3+}$, and Mg$^{2+}$.

Embodiment 51 provides the method of any one of Embodiments 39-50, wherein at each occurrence —$R^1$ is —H.

Embodiment 52 provides the method of any one of Embodiments 39-51, wherein n is about 5,000 to about 75,000.

Embodiment 53 provides the method of any one of Embodiments 39-52, wherein n is about 20,000 to about 45,000.

Embodiment 54 provides the method of any one of Embodiments 39-53, wherein z is about 2,500 to about 170,000.

Embodiment 55 provides the method of any one of Embodiments 39-54, wherein z is about 13,500 to about 65,000.

Embodiment 56 provides the method of any one of Embodiments 39-55, wherein the crosslinkable viscosifier polymer comprises repeating units having the structure:

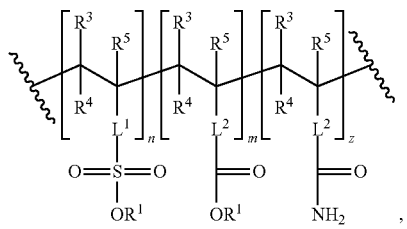

wherein the repeating units are in a block, alternate, or random configuration, and each repeating unit is independently in the orientation shown or in the opposite orientation.

Embodiment 57 provides the method of Embodiment 56, wherein m is about 0 to about 60,000.

Embodiment 58 provides the method of any one of Embodiments 56-57, wherein m is about 5,000 to about 17,000.

Embodiment 59 provides the method of any one of Embodiments 1-58, wherein the crosslinkable viscosifier polymer comprises repeating units having the structure:

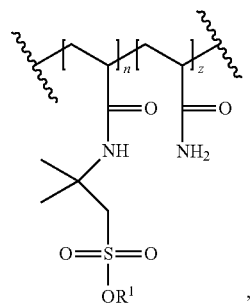

wherein the repeating units are in a block, alternate, or random configuration, and each repeating unit is independently in the orientation shown or in the opposite orientation.

Embodiment 60 provides the method of any one of Embodiments 1-59, wherein the crosslinkable viscosifier polymer comprises repeating units having the structure:

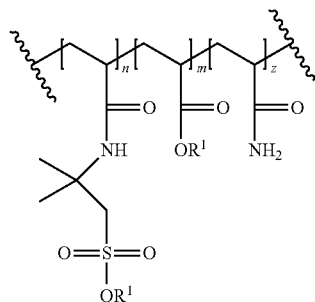

wherein the repeating units are in a block, alternate, or random configuration, and each repeating unit is independently in the orientation shown or in the opposite orientation.

Embodiment 61 provides the method of any one of Embodiments 1-60, wherein about 0.000,1 wt % to about 80 wt % of the composition is the crosslinker.

Embodiment 62 provides the method of any one of Embodiments 1-61, wherein about 10 wt % to about 30 wt % of the composition is the crosslinker.

Embodiment 63 provides the method of any one of Embodiments 6-62, wherein about 0.000,1 wt % to about 50 wt % of the composition is the crosslinker.

Embodiment 64 provides the method of any one of Embodiments 6-63, wherein about 0.001 wt % to about 1 wt % of the composition is the crosslinker.

Embodiment 65 provides the method of any one of Embodiments 1-64, wherein the crosslinker comprises at least one of chromium, aluminum, antimony, zirconium, titanium, calcium, boron, iron, silicon, copper, zinc, magnesium, and an ion thereof.

Embodiment 66 provides the method of any one of Embodiments 1-65, wherein the crosslinker comprises at least one of boric acid, borax, a borate, a $(C_1-C_{30})$hydrocarbylboronic acid, a $(C_1-C_{30})$hydrocarbyl ester of a $(C_1-C_{30})$hydrocarbylboronic acid, a $(C_1-C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate.

Embodiment 67 provides the method of any one of Embodiments 1-66, wherein the crosslinker comprises zirconium or a zirconium derivative.

Embodiment 68 provides the method of any one of Embodiments 1-67, wherein the crosslinker comprises at least one of zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate.

Embodiment 69 provides the method of any one of Embodiments 1-68, wherein the composition further comprises a fluid comprising at least one of water, an organic solvent, and an oil.

Embodiment 70 provides the method of any one of Embodiments 1-69, wherein the composition further comprises a fluid comprising at least one of dipropylene glycol methyl ether, dipropylene glycol dimethyl ether, dimethyl formamide, diethylene glycol methyl ether, ethylene glycol butyl ether, diethylene glycol butyl ether, propylene carbonate, D-limonene, a $C_2-C_{40}$ fatty acid $C_1-C_{10}$ alkyl ester, 2-butoxy ethanol, butyl acetate, furfuryl acetate, dimethyl sulfoxide, dimethyl formamide, diesel, kerosene, mineral oil, a hydrocarbon comprising an internal olefin, a hydrocarbon comprising an alpha olefin, xylenes, an ionic liquid, methyl ethyl ketone, and cyclohexanone.

Embodiment 71 provides the method of any one of Embodiments 1-70, wherein the composition further comprises a secondary viscosifier.

Embodiment 72 provides the method of Embodiment 71, wherein the secondary viscosifier comprises at least one of a substituted or unsubstituted polysaccharide, and a substituted or unsubstituted polyalkenylene, wherein the substituted or unsubstituted polysaccharide or polyalkenylene is crosslinked or uncrosslinked.

Embodiment 73 provides the method of any one of Embodiments 71-72, wherein the secondary viscosifier comprises a polymer comprising at least one monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide.

Embodiment 74 provides the method of any one of Embodiments 71-73, wherein the secondary viscosifier comprises a crosslinked gel or a crosslinkable gel.

Embodiment 75 provides the method of any one of Embodiments 71-74, wherein the secondary viscosifier comprises at least one of a linear polysaccharide, and poly($(C_2-C_{10})$alkenylene), wherein the $(C_2-C_{10})$alkenylene is substituted or unsubstituted.

Embodiment 76 provides the method of any one of Embodiments 71-75, wherein the secondary viscosifier comprises at least one of poly(acrylic acid) or $(C_1-C_5)$alkyl esters thereof, poly(methacrylic acid) or $(C_1-C_5)$alkyl esters thereof, poly(vinyl acetate), poly(vinyl alcohol), poly(ethylene glycol), poly(vinyl pyrrolidone), polyacrylamide, poly(hydroxyethyl methacrylate), alginate, chitosan, curdlan, dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, welan, derivatized starch, tamarind, tragacanth, guar gum, derivatized guar, gum ghatti, gum arabic, locust bean gum, derivatized cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar.

Embodiment 77 provides the method of any one of Embodiments 71-76, wherein the secondary viscosifier comprises poly(vinyl alcohol) homopolymer, poly(vinyl alcohol) copolymer, a crosslinked poly(vinyl alcohol) homopolymer, and a crosslinked poly(vinyl alcohol) copolymer.

Embodiment 78 provides the method of any one of Embodiments 1-77, wherein the composition further comprises a secondary crosslinker comprising at least one of chromium, aluminum, antimony, zirconium, titanium, calcium, boron, iron, silicon, copper, zinc, magnesium, and an ion thereof.

Embodiment 79 provides the method of Embodiment 78, wherein the secondary crosslinker comprises at least one of boric acid, borax, a borate, a $(C_1$-$C_{30})$hydrocarbylboronic acid, a $(C_1$-$C_{30})$hydrocarbyl ester of a $(C_1$-$C_{30})$hydrocarbylboronic acid, a $(C_1$-$C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate.

Embodiment 80 provides the method of any one of Embodiments 1-79, further comprising combining the composition, or a crosslinked reaction product thereof, with an aqueous or oil-based fluid comprising a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof, to form a mixture, wherein the placing the composition in the subterranean formation comprises placing the mixture in the subterranean formation.

Embodiment 81 provides the method of any one of Embodiments 1-80, wherein at least one of prior to, during, and after the placing of the composition in the subterranean formation, the composition, or a crosslinked reaction product thereof, is used downhole, at least one of alone and in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof.

Embodiment 82 provides the method of any one of Embodiments 1-81, wherein the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material polymer, oxidizer, a marker. Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 83 provides the method of any one of Embodiments 1-82, wherein the placement of the composition in the subterranean formation comprises fracturing at least part of the subterranean formation to form at least one subterranean fracture.

Embodiment 84 provides the method of any one of Embodiments 1-83, wherein the composition further comprises a proppant, a resin-coated proppant, or a combination thereof.

Embodiment 85 provides the method of any one of Embodiments 1-84, wherein the placing of the drilling fluid composition in the subterranean formation downhole comprises pumping the drilling fluid composition through a drill string disposed in a wellbore, through a drill bit at a downhole end of the drill string, and back above-surface through an annulus.

Embodiment 86 provides the method of Embodiment 85, further comprising processing the drilling fluid composition exiting the annulus with at least one fluid processing unit to generate a cleaned drilling fluid composition and recirculating the cleaned drilling fluid composition through the wellbore.

Embodiment 87 provides a system configured to perform the method of any one of Embodiments 1-86, the system comprising:
  the composition comprising the crosslinkable viscosifier and the crosslinker; and
  the subterranean formation comprising the composition therein.

Embodiment 88 provides the system of Embodiment 87, further comprising
  a drillstring disposed in a wellbore, the drillstring comprising a drill bit at a downhole end of the drillstring;
  an annulus between the drillstring and the wellbore; and
  a pump configured to circulate the composition through the drill string, through the drill bit, and back above-surface through the annulus.

Embodiment 89 provides the system of Embodiment 88, further comprising a fluid processing unit configured to process the composition exiting the annulus to generate a cleaned composition for recirculation through the wellbore.

Embodiment 90 provides a method of treating a subterranean formation, the method comprising:
  obtaining or providing a composition comprising
    a crosslinkable viscosifier polymer comprising repeating units having the structure:

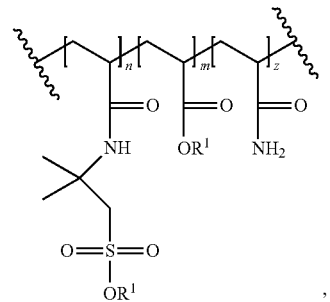

wherein
    at each occurrence $R^1$ is independently selected from the group consisting of —H and a counterion,
    the repeating units are in a block, alternate, or random configuration, and each repeating unit is independently in the orientation shown or in the opposite orientation,
    the crosslinkable viscosifier polymer has a molecular weight of about 5,000,000 g/mol to about 15,000,000 g/mol, and
    n is about 5,000 to about 75,000, z is about 2,500 to about 170,000, and m is about 0 to about 60,000;
  a crosslinker comprising at least one of zirconium and a zirconium derivative; and a downhole fluid comprising at least one of an aqueous drilling fluid and an aqueous fracturing fluid; and
placing the composition in a subterranean formation downhole, wherein about 0.01 wt % about 10 wt % of the composition is the crosslinkable viscosifier polymer and the crosslinker.

Embodiment 91 provides the method of 90, wherein the downhole fluid comprises at least one of a drilling fluid and a hydraulic fracturing fluid.

Embodiment 92 provides a system comprising:
a composition comprising
a crosslinkable viscosifier polymer having about $Z^1$ mol % of an ethylene repeating unit comprising a —C(O)NH$_2$ group, about $N^1$ mol % of an ethylene repeating unit comprising an —S(O)$_2$OR$^1$ group, and about $M^1$ mol % of an ethylene repeating unit comprising a —C(O)OR$^1$ group, wherein
at each occurrence R$^1$ is independently selected from the group consisting of —H and a counterion.
the repeating units are in block, alternate, or random configuration,
$Z^1$ is about 10% to about 90%, and $N^1$ is about 10% to about 90%, $M^1$ is about 0% to about 40%, and
the crosslinkable viscosifier polymer has a molecular weight of about 5,000,000 g/mol to about 15,000,000 g/mol; and
a crosslinker comprising at least one of zirconium and a zirconium derivative; and
a subterranean formation comprising the composition therein.

Embodiment 93 provides the system of Embodiment 92, further comprising
a drillstring disposed in a wellbore, the drillstring comprising a drill bit at a downhole end of the drillstring;
an annulus between the drillstring and the wellbore; and
a pump configured to circulate the composition through the drill string, through the drill bit, and back above-surface through the annulus.

Embodiment 94 provides the system of Embodiment 93, further comprising a fluid processing unit configured to process the composition exiting the annulus to generate a cleaned drilling fluid for recirculation through the wellbore.

Embodiment 95 provides the system of any one of Embodiments 92-94, further comprising
a tubular disposed in a wellbore; and
a pump configured to pump the composition downhole.

Embodiment 96 provides a composition for treatment of a subterranean formation, the composition comprising:
a crosslinkable viscosifier polymer having about $Z^1$ mol % of an ethylene repeating unit comprising a —C(O) NH$_2$ group, about $N^1$ mol % of an ethylene repeating unit comprising an —S(O)$_2$OR$^1$ group, and about $M^1$ mol % of an ethylene repeating unit comprising a —C(O)OR$^1$ group, wherein
at each occurrence R$^1$ is independently selected from the group consisting of —H and a counterion,
the repeating units are in block, alternate, or random configuration,
$Z^1$ is about 10% to about 90%, $N^1$ is about 10% to about 90%, and $M^1$ is about 0% to about 40%, and
the crosslinkable viscosifier polymer has a molecular weight of about 5,000,000 g/mol to about 15,000,000 g/mol; and
a crosslinker comprising at least one of zirconium and a zirconium derivative; and
a downhole fluid.

Embodiment 97 provides the composition of Embodiment 96, wherein the downhole fluid comprises at least one of a water-based drilling fluid and a water-based hydraulic fracturing fluid.

Embodiment 98 provides a crosslinked reaction product of the composition of any one of Embodiments 96-97.

Embodiment 99 provides a composition for treatment of a subterranean formation, the composition comprising:
a crosslinkable viscosifier polymer comprising repeating units having the structure:

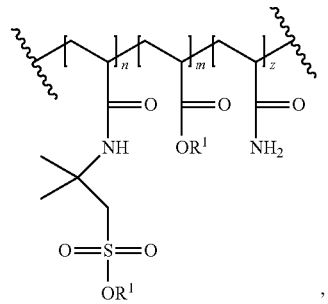

wherein
at each occurrence R$^1$ is independently selected from the group consisting of —H and a counterion,
the repeating units are in a block, alternate, or random configuration, and each repeating unit is independently in the orientation shown or in the opposite orientation.
the crosslinkable viscosifier polymer has a molecular weight of about 5,000,000 g/mol to about 15,000,000 g/mol, and
n is about 5,000 to about 75,000, z is about 2,500 to about 170,000, and m is about 0 to about 60,000; and
a crosslinker comprising at least one of zirconium and a zirconium derivative; and
a downhole fluid comprising at least one of an aqueous drilling fluid and an aqueous hydraulic fracturing fluid, wherein about 0.01 wt % about 10 wt % of the composition is the crosslinkable viscosifier polymer and the crosslinker.

Embodiment 100 provides a crosslinked reaction product of the composition of Embodiment 99.

Embodiment 101 provides a method of preparing a composition for treatment of a subterranean formation, the method comprising:
forming a composition comprising
a crosslinkable viscosifier polymer having about $Z^1$ mol % of an ethylene repeating unit comprising a —C(O)NH$_2$ group, about $N^1$ mol % of an ethylene repeating unit comprising an —S(O)$_2$OR$^1$ group, and about $M^1$ mol % of an ethylene repeating unit comprising a —C(O)OR$^1$ group, wherein
at each occurrence R$^1$ is independently selected from the group consisting of —H and a counterion.
the repeating units are in block, alternate, or random configuration,
$Z^1$ is about 10% to about 90%, $N^1$ is about 10% to about 90%, $M^1$ is about 0% to about 40%, and
the crosslinkable viscosifier polymer has a molecular weight of about 5,000,000 g/mol to about 15,000,000 g/mol;
a crosslinker comprising at least one of zirconium and a zirconium derivative; and a downhole fluid.

Embodiment 102 provides the composition, apparatus, method, or system of any one or any combination of Embodiments 1-101 optionally configured such that all elements or options recited are available to use or select from.

What is claimed is:

1. A method of treating a subterranean formation, the method comprising:
   placing in a subterranean formation a composition comprising
   a crosslinkable viscosifier polymer comprising an ethylene repeating unit comprising a —C(O)NH$_2$ group and an ethylene repeating unit comprising an —S(O)$_2$OR$^1$ group, wherein
      at each occurrence R$^1$ is independently selected from the group consisting of —H and a counterion,
      the crosslinkable viscosifier polymer further comprises an ethylene repeating unit comprising a —C(O)OR$^1$ group, and
      the repeating units are in block, alternate, or random configuration; and
   at least one crosslinker.

2. The method of claim 1, wherein the composition includes an aqueous liquid.

3. The method of claim 1, further comprising at least partially crosslinking the crosslinkable viscosifier polymer to provide a crosslinked viscosifier polymer.

4. The method of claim 1, wherein about 0.001 wt % to about 95 wt % of the composition is the crosslinkable viscosifier polymer.

5. The method of claim 1, wherein the crosslinkable viscosifier polymer has about Z$^1$ mol % of the ethylene repeating unit comprising the —C(O)NH$_2$ group and has about N$^1$ mol % of the ethylene repeating unit comprising the —S(O)$_2$R$^1$ group, wherein Z$^1$ is about 10% to about 90%, and N$^1$ is about 10% to about 90%.

6. The method of claim 5, whererein Z$^1$+N$^1$ is about 100%.

7. The method of claim 5, wherein the crosslinkable viscosifier polymer further comprises about M$^1$ mol % of the ethylene repeating unit comprising the —C(O)OR$^1$ group, wherein M$^1$ is about 0% to about 40%.

8. The method of claim 7, wherein Z$^1$+N$^1$+M$^1$ is about 100%.

9. The method of claim 1, wherein the crosslinkable viscosifier polymer has a molecular weight of about 5,000,000 g/mol to about 15,000,000 g/mol.

10. The method of claim 1, wherein the crosslinkable viscosifier polymer comprises repeating units having the structure:

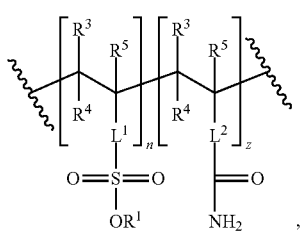

wherein
at each occurrence R$^3$, R$^4$, and R$^5$ are independently selected from the group consisting of —H and a substituted or unsubstituted C$_1$-C$_5$ hydrocarbyl,
at each occurrence L$^1$ and L$^2$ are independently selected from the group consisting of a bond and a substituted or unsubstituted C$_1$-C$_{40}$ hydrocarbyl interrupted or terminated with 0, 1, 2, or 3 of at least one of —NR$^3$—, —S—, and —O—,
the repeating units are in a block, alternate, or random configuration, and each repeating unit is independently in the orientation shown or in the opposite orientation.

11. The method of claim 10, wherein n is about 5,000 to about 75,000.

12. The method of claim 10, wherein z is about 2,500 to about 170,000.

13. The method of claim 10, wherein the crosslinkable viscosifier polymer comprises repeating units having the structure:

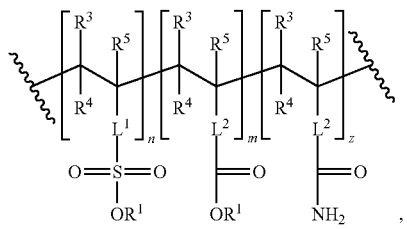

wherein the repeating units are in a block, alternate, or random configuration, and each repeating unit is independently in the orientation shown or in the opposite orientation.

14. The method of claim 13, wherein m is about 0 to about 60,000.

15. The method of claim 1, wherein about 0.000,1 wt % to about 80 wt % of the composition is the crosslinker.

16. The method of claim 1, wherein the composition further comprises a secondary viscosifier.

17. The method of claim 1, wherein the composition further comprises a secondary crosslinker comprising at least one of chromium, aluminum, antimony, zirconium, titanium, calcium, boron, iron, silicon, copper, zinc, magnesium, and an ion thereof.

18. A method of treating a subterranean formation, the method comprising:
   placing in a subterranean formation a composition comprising
   a crosslinkable viscosifier polymer comprising repeating units having the structure:

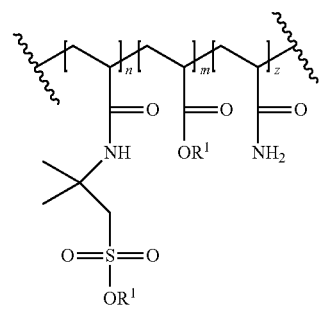

wherein
at each occurrence R$^1$ is independently selected from the group consisting of —H and a counterion, the repeating units are in a block, alternate, or random configuration, and each repeating unit is independently in the orientation shown or in the opposite orientation, the crosslinkable viscosifier polymer has a molecular weight of about 5,000,000 g/mol to about 15,000,000 g/mol, and n is about 5,000 to about 75,000, z is about 2,500 to about 170,000, and m is about 0 to about 60,000;

a crosslinker comprising at least one of zirconium and a zirconium derivative; and a downhole fluid comprising at least one of an aqueous drilling fluid and an aqueous fracturing fluid;

wherein about 0.01 wt % about 10 wt % of the composition is the crosslinkable viscosifier polymer and the crosslinker.

19. A method of treating a subterranean formation, the method comprising:

placing in a subterranean formation a composition comprising a crosslinkable viscosifier polymer comprising an ethylene repeating unit comprising a —C(O)NH$_2$ group and an ethylene repeating unit comprising an —S(O)$_2$OR$^1$ group, wherein at each occurrence R$^1$ is independently selected from the group consisting of —H and a counterion, wherein the ethylene repeating unit comprising the —C(O)NH$_2$ group and the ethylene repeating unit comprising the —S(O)$_2$OR$^1$ group are in block, alternate, or random configuration; and wherein the crosslinkable viscosifier polymer comprises repeating units having the structure:

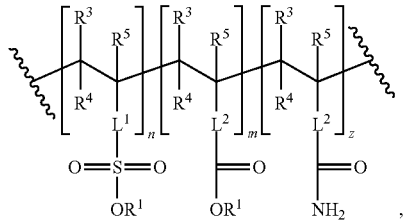

wherein the repeating units are in a block, alternate, or random configuration, and each repeating unit is independently in the orientation shown or in the opposite orientation; and at least one crosslinker.

20. The method of claim 19, wherein m is about 0 to about 60,000.

* * * * *